US012785751B2

(12) United States Patent
Rupe

(10) Patent No.: US 12,785,751 B2
(45) Date of Patent: Nov. 3, 2026

(54) METHODS AND SYSTEMS FOR IDENTIFYING A FEATURE IN A COMMUNICATION NETWORK

(71) Applicant: Cable Television Laboratories, Inc., Louisville, CO (US)

(72) Inventor: Jason W. Rupe, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 41 days.

(21) Appl. No.: 19/072,217

(22) Filed: Mar. 6, 2025

(65) Prior Publication Data

US 2025/0286582 A1 Sep. 11, 2025

Related U.S. Application Data

(60) Provisional application No. 63/561,847, filed on Mar. 6, 2024.

(51) Int. Cl.
*H04B 10/85* (2013.01)
*H04B 3/46* (2015.01)
*H04L 5/00* (2006.01)

(52) U.S. Cl.
CPC ............. *H04B 3/46* (2013.01); *H04L 5/0048* (2013.01)

(58) Field of Classification Search
CPC ........................... H04B 10/85; H04B 1/70753; H04B 1/70754; H04B 1/7115; H04B 1/7117; H04B 10/071; H04B 10/40; H04B 10/504; H04L 25/497; H04L 5/0023; H04L 5/0048; G01S 13/888; G01S 7/41; G01S 17/10; G01S 13/931; G01S 7/36; G01S 13/89; G01S 17/931; G01S 7/282; G01S 13/32
See application file for complete search history.

(56) References Cited

U.S. PATENT DOCUMENTS

2023/0121544 A1* 4/2023 Shi ........................ G01S 7/4873 356/4.01
2023/0273307 A1* 8/2023 Abdul Kareem ...... H04B 1/717 342/21
2024/0132032 A1* 4/2024 Matsumoto ............. B60T 8/175

* cited by examiner

*Primary Examiner* — Eva Y Puente
(74) *Attorney, Agent, or Firm* — PdZ Patent Law, PLLC

(57) ABSTRACT

A method for identifying a feature in a communication network includes (a) receiving, at a first termination device of the communication network, a message specifying an assignment of first network resources of the communication network to the first termination device, (b) sending, from the first termination device, one or more transmitted signals into infrastructure of the communication network at one or more times specified by the assignment of the first network resources, the one or more transmitted signals being within one or more frequency ranges specified by the assignment of the first network resources, and (c) capturing, at the first termination device, one or more reflection signals from the infrastructure of the communication network resulting from reflection of the one or more transmitted signals by one or more features of the infrastructure of the communication network.

20 Claims, 16 Drawing Sheets

METHODS AND SYSTEMS FOR IDENTIFYING A FEATURE IN A COMMUNICATION NETWORK

RELATED APPLICATIONS

This application claims benefit of U.S. Provisional Patent Application No. 63/561,847, filed on Mar. 6, 2024, which is incorporated herein by reference.

BACKGROUND

Communication mediums are used to transmit data in a communication network. Examples of communication mediums include, but are not limited to, coaxial electrical cables, twisted pair electrical cables (e.g., Ethernet cables and telephone cables), optical cables, and free space (e.g., for free space radio wireless communication links and free space optical wireless communication links). Communication networks are increasingly capable of transmitting data though a communication medium at a high bandwidth, such as by using sophisticated modulation techniques. However, these modulation techniques frequently require a substantially ideal communication medium, and an impairment in the communication medium, such as an impedance discontinuity, may therefore significantly degrade, or even completely inhibit, data transmission through the communication medium. Therefore, it is desirable to identify an impairment in a communication medium, such as to enable the impairment to be mitigated.

SUMMARY

Disclosed herein are methods and systems for identifying a feature, such as an impairment, in a communication network using one or more termination devices of the communication network. In certain embodiments, a termination device sends one or more transmitted signals into communication infrastructure of a communication network, and the termination device subsequently captures one or more reflection signals from the communication infrastructure resulting from the reflection of the one or more transmitted signals by one or more features in the communication network. The reflection signals are processed, such as using TDR and/or other processing techniques, to determine the location of the features relative to the termination device and/or to determine other characteristics, such as reflection strength, of the features. Additionally, in some embodiments, a termination device is configured to effectively reflect a signal received from communication infrastructure of a communication network back into the communication infrastructure as a loopback signal, to facilitate identification of features in the communication network. Furthermore, in certain embodiments, reflection signals are captured by two or more termination devices of a communication network, and a feature of the communication network is identified at least partially based on respective reflection signals received by two or more of the termination devices. Moreover, particular embodiments leverage phase information in a communication network to determine relative location of one of more features from a termination device of the communication network.

In an embodiment, a method for identifying a feature in a communication network includes (a) receiving, at a first termination device of the communication network, a message specifying an assignment of first network resources of the communication network to the first termination device, (b) sending, from the first termination device, one or more transmitted signals into infrastructure of the communication network at one or more times specified by the assignment of the first network resources, the one or more transmitted signals being within one or more frequency ranges specified by the assignment of the first network resources, and (c) capturing, at the first termination device, one or more reflection signals from the infrastructure of the communication network resulting from reflection of the one or more transmitted signals by one or more features of the infrastructure in the communication network.

In an embodiment, a method for identifying a feature in a communication network includes (a) receiving, at a first termination device of the communication network, a message instructing the first termination device to monitor infrastructure of the communication network for presence of signals within a specified time period and within a specified frequency range, (b) capturing, at the first termination device, a transmitted signal during the specified time period, (c) sending, from the first termination device, a loopback signal into the infrastructure of the communication network, the loopback signal being a function of the transmitted signal captured by the first termination device, and (d) capturing, at the first termination device, one or more first reflection signals from the infrastructure of the communication network resulting from reflection of the loopback signal by one or more features of the infrastructure of the communication network.

In an embodiment, a method for identifying a feature in a communication network includes (a) receiving, at a first termination device of the communication network, a message instructing the first termination device to monitor infrastructure of the communication network for presence of signals within a specified time period and within a specified frequency range, (b) receiving, at a second termination device of the communication network, a message instructing the second termination device to monitor the infrastructure of the communication network for presence of signals within the specified time period and within the specified frequency range, (c) capturing, at the first termination device, one or more first reflection signals from the infrastructure of the communication network resulting from reflection of one or more transmitted signals by one or more first features in the infrastructure of the communication network, the one or more transmitted signals being within the specified frequency range, and (d) capturing, at the second termination device, one or more second reflection signals from the infrastructure of the communication network resulting from reflection of the one or more transmitted signals by the one or more first features in the infrastructure of the communication network.

In an embodiment, a method for determining respective locations of one or more features of a communication network relative to a cable modem of the communication network includes (a) controlling the cable modem and a network hub of the communication network to determine a channel response of the communication network between the cable modem and the network hub using one or more of (i) a channel estimation process, (ii) a pre-equalization process, and (iii) a symbol capture process, (b) converting the channel response from a frequency domain to a time domain, (c) determining signal phase information from the channel response in the time domain, and (d) estimating respective distances of the one or more features of the communication network from the cable modem at least partially based on the signal phase information.

DETAILED DESCRIPTION OF THE EMBODIMENTS

Figure 1:
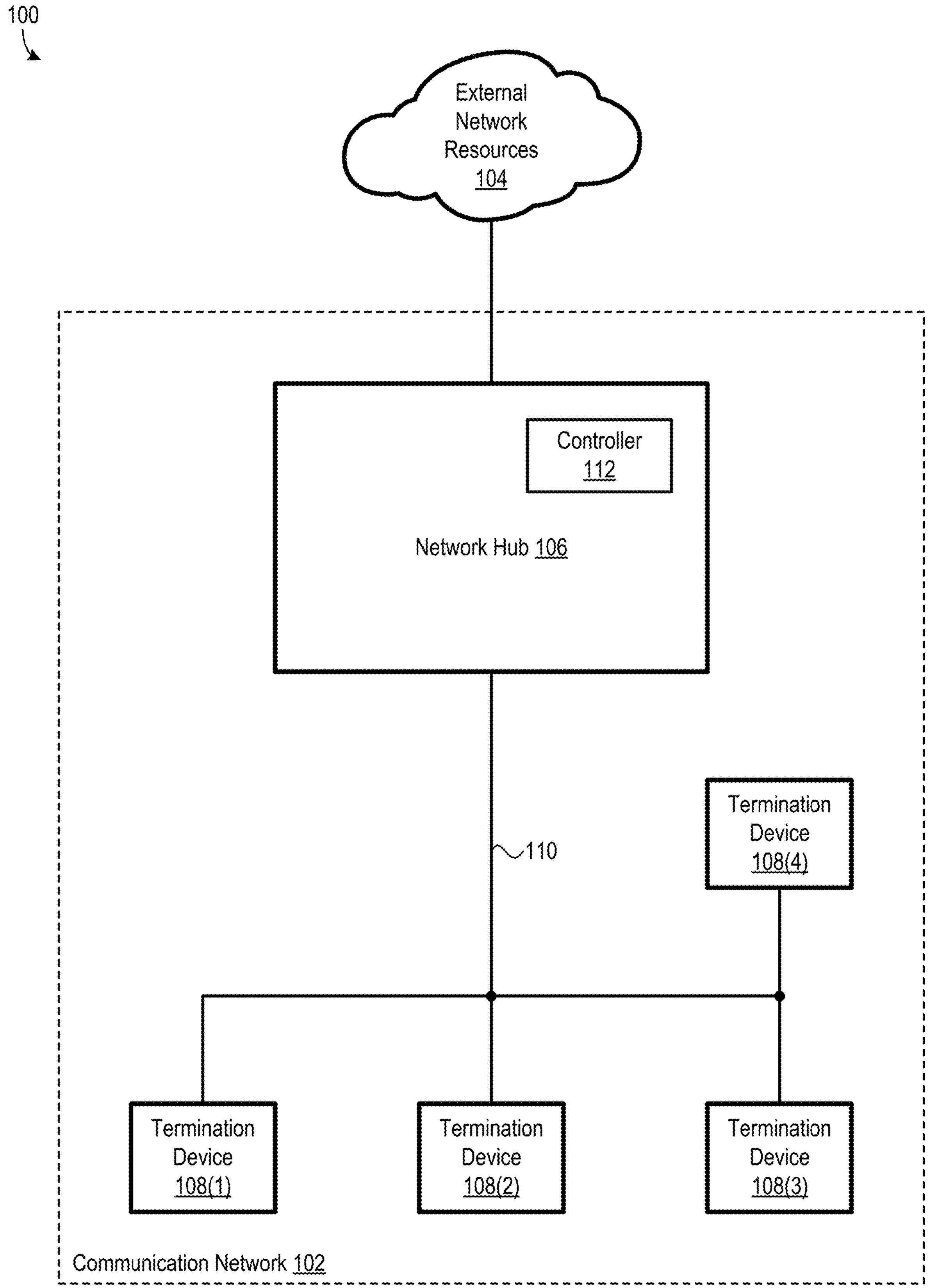
FIG. 1 is a schematic diagram of a communication environment including a system for identifying a feature in a communication network, according to an embodiment.

Time Domain Reflectometry (TDR) may be used to determine one or more characteristics of an impairment in a communication medium. TDR operates on the principle that a portion of a signal traveling through a communication medium will be returned to its source as a reflection signal in response to the signal encountering a discontinuity in the communication medium. In this document, a "discontinuity" includes, for example, one or more of an impedance change, a change in index of refraction, an obstruction, or a reflective feature, such as a reflective surface. Location of the discontinuity may be determined from timing of the reflection signal, and characteristics of the discontinuity may be determined from characteristics of the reflection signal. For example, consider a cable communication network including a cable modem connected to a coaxial electrical cable where there is an impedance discontinuity in the coaxial electrical cable. A portion of a communication signal sent from the cable modem into the coaxial electrical cable will return to the cable modem as a reflected signal due to the communication signal encountering the impedance discontinuity. A distance between the cable modem and the impedance discontinuity along the coaxial electrical cable can be determined using TDR by dividing (i) a difference between a time when the reflection signal was received by the cable modem and a time that the communication signal was sent by the cable modem into the coaxial electrical cable by (ii) velocity of signal propagation along the coaxial electrical cable.

It has historically been difficult to apply TDR to a cable communication network due to the presence of filters and other devices which block the transmission of signals outside of specified frequency ranges in the cable communication network. However, such filters and other devices are increasingly absent from cable communication networks to enable use of new communication techniques, such as Full Duplex (FDX) communication according to a Data Over Cable Service Interface Specification (DOCSIS) 3.1 or 4.0 communication standard. As such, modern cable communication networks are increasingly capable of transmitting signals in frequency ranges which enable TDR more broadly. Applicant has determined that this capability of modern cable communication networks can be leveraged to perform TDR in a cable communication network using termination devices, i.e., cable modems, of the cable communication network.

Disclosed herein are methods and systems for identifying an impairment or other feature in a communication network using one or more termination devices of the communication network. In certain embodiments, a termination device sends one or more transmitted signals into the communication infrastructure of a communication network, and the termination device subsequently captures one or more reflection signals from the communication infrastructure resulting from reflection of the one or more transmitted signals by one or more features in the communication network. The reflection signals are processed, such as using TDR and/or other processing techniques, to determine location of the features relative to the termination device and/or to determine other characteristics, such as reflection strength, of the features. Additionally, in some embodiments, a termination device is configured to effectively reflect a signal received from the communication infrastructure of a communication network back into the communication infrastructure as a loopback signal, to facilitate identification of impairments or other features in the communication network. Furthermore, in certain embodiments, reflection signals are captured by two or more termination devices of a communication network, and an impairment or other feature of the communication network is identified at least partially based on respective reflection signals received by two or more of the termination devices. Moreover, particular embodiments leverage phase information in a communication network to determine relative location of one of more impairments or other features from a termination device of the communication network.

The new methods and systems are discussed below primarily with respect to a cable communication network application where the termination devices are cable modems and a network hub includes one or more of a cable modem termination system (CMTS) and a remote physical layer (R-PHY) device. However, it should be understood that the new methods and systems are not limited to a cable communication network application. For example, certain embodiments of the new methods and systems could be applied to a passive optical network (PON) communication network, a digital subscriber line (DSL) communication network, a coherent optical communication network, or a wireless communication network.

FIG. 1 is a schematic diagram of a communication environment 100 including a communication network 102 and external network resources 104. As discussed below, communication network 102 includes elements which implement embodiments of the new methods and systems for identifying a feature in a communication network. Communication network 102 includes a network hub 106, termination devices 108, and communication infrastructure 110. In this document, specific instances of an item may be referred to by use of a numeral in parentheses (e.g. termination device 108(1)) while numerals without parentheses refer to any such item (e.g. termination devices 108). Although FIG. 1 depicts communication network 102 as including four termination devices 108, the quantity of termination devices 108 in communication network 102 may vary. For example, some embodiments of communication network 102 include only a single termination device 108, while other embodiments of communication network 102 include a large quantity of termination devices 108, such as tens, hundreds, thousands, or even more, termination devices 108.

Each termination device 108 is configured to provide a respective interface to communication network 102. For example, in some embodiments, one or more termination device 108 is a cable modem, a DSL modem, an optical network termination (ONT), an optical network unit (ONU), or a wireless modem. Each termination device 108 need not have the same configuration. In certain embodiments, one or more termination devices 108 are located at respective subscriber premises, such as to enable subscribers to communicatively interface user equipment, such as computers, mobile phones, televisions, Internet of things (IoT) devices, security devices, entertainment devices, etc., to communication networks 102. Additionally, termination devices 108 are optionally integrated with one or more other devices. For example, in some embodiments, one or more termination devices 108 are integrated with a wireless access point and a network switch as part of a premises gateway. Furthermore, in particular embodiments, one or more of termination devices 108 are portable devices that may be easily moved within communication network 102, such as to facilitate feature identification.

Communication infrastructure 110 communicatively couples each termination devices 108 to network hub 106. Communication infrastructure 110 includes, for example, one or more coaxial electrical cables, optical cables, twisted pair electrical cables, coupling devices (e.g., taps, splices, and/or splitters), filters, domain conversion devices (e.g., fiber nodes and/or remote terminals), amplifiers, power inserters, wireless communication devices, etc. Although communication network 102 is illustrated as having a point to multi-point mesh topology, the topology of communication network 102 could vary. For example, in some embodiments, communication infrastructure 110 is configured as a ring such that communication network 102 has a ring topology. As another example, in certain embodiments, communication infrastructure 110 includes a respective communication medium for each termination device 108, such that communication network 102 has a star topology. As an additional example, communication infrastructure 110 could be modified to have a mesh topology different from that of FIG. 1.

Network hub 106 is configured to control communication between termination devices 108 and network hub 106 via communication infrastructure 110, and network hub 106 is also configured to interface communication network 102 with external network resources 104. Certain embodiments of network hub 106 are further configured to control communication between two or more termination devices 108 via communication infrastructure 110, such as to enable peer-to-peer communication between termination devices 108. In some embodiments, network hub 106 includes one or more of a CTMS, a R-PHY device, an optical line terminal (OLT), a broadband network gateway (BNG), an ONU, an ONT, a digital subscriber line access multiplexer (DSLAM), and a core wireless communication network. In particular embodiments, external network resources 104 include one or more of the Internet, an intranet, a content delivery system, a computing system (e.g., a distributed or "cloud" computing system), a conferencing system, a data storage system, a communication system, an authentication, authorization, and accounting system, an another communication network (e.g., a wide area network (WAN), a metropolitan area network (MAN), a local area network (LAN), and/or a transmission communication network).

Particular embodiments of communication network 102 are configured as an access communication network. For example, some embodiments of communication network 102 are configured as a cable communication network, such as discussed below with respect to FIG. 12, a passive optical network (PON) communication network, such as discussed below with respect to FIG. 14, a DSL communication network, or a wireless communication network, such as discussed below with respect to FIG. 16. However, communication network 102 could be configured as another type of network. For example, communication network 102 could be configured as a coherent optical network, such discussed below with respect to FIG. 15. As another example, communication network 102 could be configured as a hyperscaler data center network, a LAN, a WAN, or a MAN.

Network hub 106 is illustrated as including a controller 112 which cooperates with termination devices 108 to implement one or more embodiments of the new methods for identifying a feature in a communication network. Accordingly, controller 112 and termination devices 108 collectively implement an embodiment of the new systems for identifying a feature in a communication network. Controller 112 is formed, for example, of digital electronic circuitry and/or analog electronic circuitry. For instance, some embodiments of controller 112 are implemented by one or more processors executing non-transitory instructions, such as software and/or firmware, stored in a data store, e.g., stored in one or more memories. While controller 112 is depicted as being a discrete element of network hub 106, controller 112 could be integrated with one or more elements of network hub 106. For example, in certain embodiments of network hub 106 including a CMTS, controller 112 is at least partially implemented by one or more processors of the CMTS executing firmware and/or software stored in a memory of the CMTS. Additionally, controller 112 could be external to network hub 106 without departing from the scope hereof. For example, in some alternate embodiments, controller 112 is implemented in external network resources 104. As another example, in some other alternate embodiments, controller 112 is a stand-alone device communicatively coupled to communication infrastructure 110. As an additional example, in certain additional alternate embodiments, controller 112 is implemented in one or more termination devices 108. Furthermore, controller 112 could be distributed among two or more elements within communication networks 102 and/or external to communication networks 102. For example, controller 112 could be split between network hub 106 and one or more termination devices 108. As another example, controller 112 could be distributed among two or more termination devices 108. As a further example, controller 112 could be distributed between network hub 106 and external network resources 104.

In certain embodiments of communication network 102, one or more termination devices 108 are capable of sending signals into communication infrastructure 110 in a particular frequency range and receiving signals from communication infrastructure 110 in at least the same frequency range. Applicant has determined that this feature can be leveraged to perform TDR, and/or another feature identification method in communication network 102, using solely a single termination device 108 as both a transmitted signal source and a signal receiver. Accordingly, particular embodiments of communication network 102 are configured to use a single termination device 108 to send transmitted signals into communication infrastructure 110 and to capture reflection signals from communication infrastructure 110 resulting from the transmitted signals encountering a feature, such as an impairment, in communication infrastructure 110. Communication network 102 and/or an external device subsequently analyze the captured reflection signals to identify the feature in communication infrastructure 110. Additionally, in some embodiments, one or more termination devices 108 are configured to capture ingress signals on communication infrastructure 110, such as due to a defect in communication infrastructure 110.

Discussed below with respect to FIGS. 2-7 are several examples of how certain embodiments of communication network 102 identify a feature in communication infrastructure 110 using a single termination device 108 as both a transmitted signal source and a signal receiver. The example methods of FIGS. 2 and 4-7 are discussed below with respect to a scenario illustrated in FIG. 3 where there is an impairment in communication infrastructure 110 affecting solely termination device 108(1) as well as an ingress point in communication infrastructure 110 potentially affecting all termination devices 108. It is understood, though, that the methods of FIGS. 2 and 4-7 could be used to identify other impairments in communication infrastructure 110. Additionally, the example methods of FIGS. 2 and 4-7 are discussed below assuming that termination device 108(1) serves as a transmitted signal source and a signal receiver. It is understood, however, that the example methods of FIGS. 2 and 4-7 could be implemented with another termination device 108 of communication network 102, e.g., termination device 108(2), 108(3), or 108(4) serving as a transmitted signal source and a signal receiver.

Figure 2:
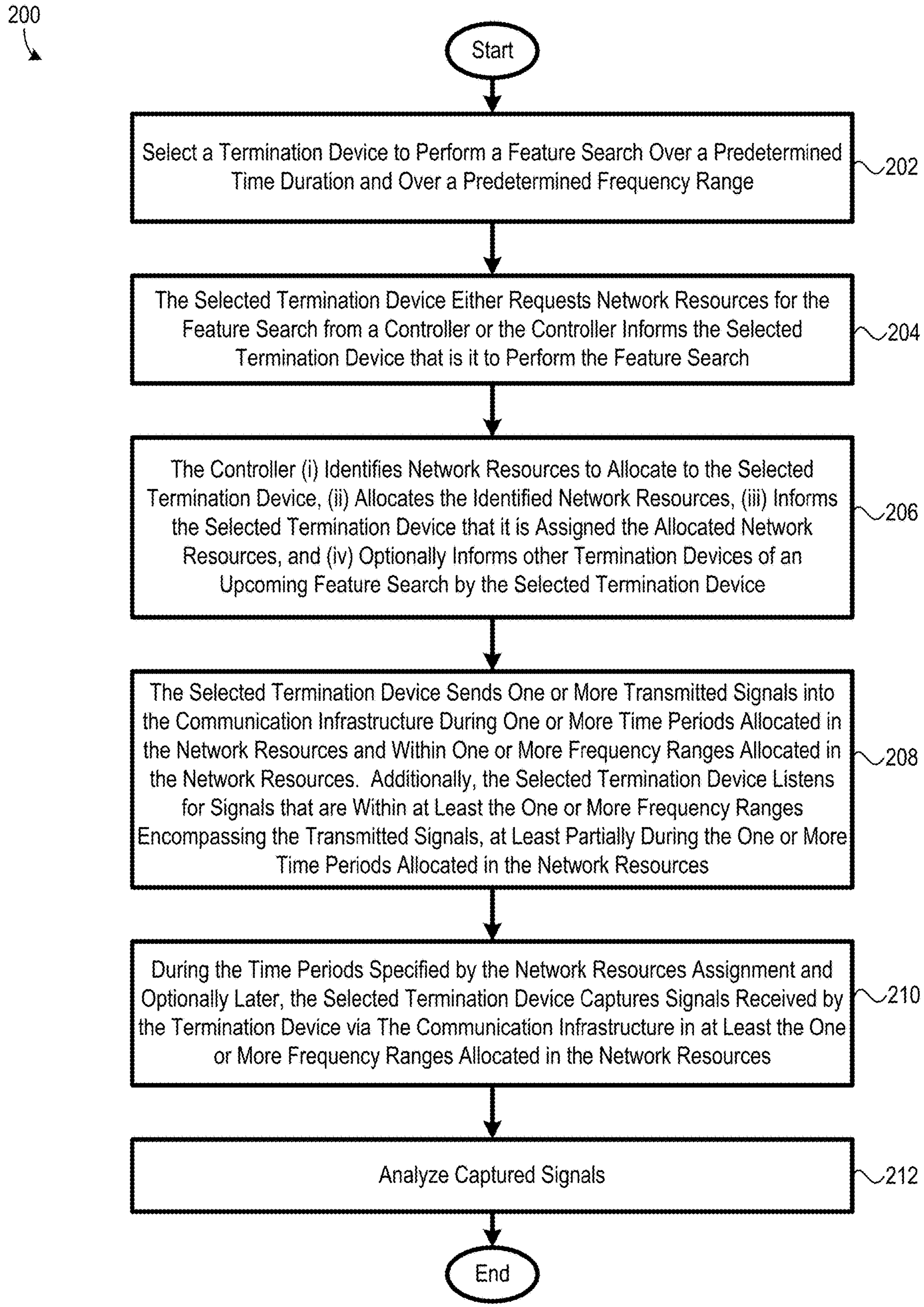
FIG. 2 is a flow chart of a method for identifying a feature in a communication network, according to an embodiment.
Figure 3:
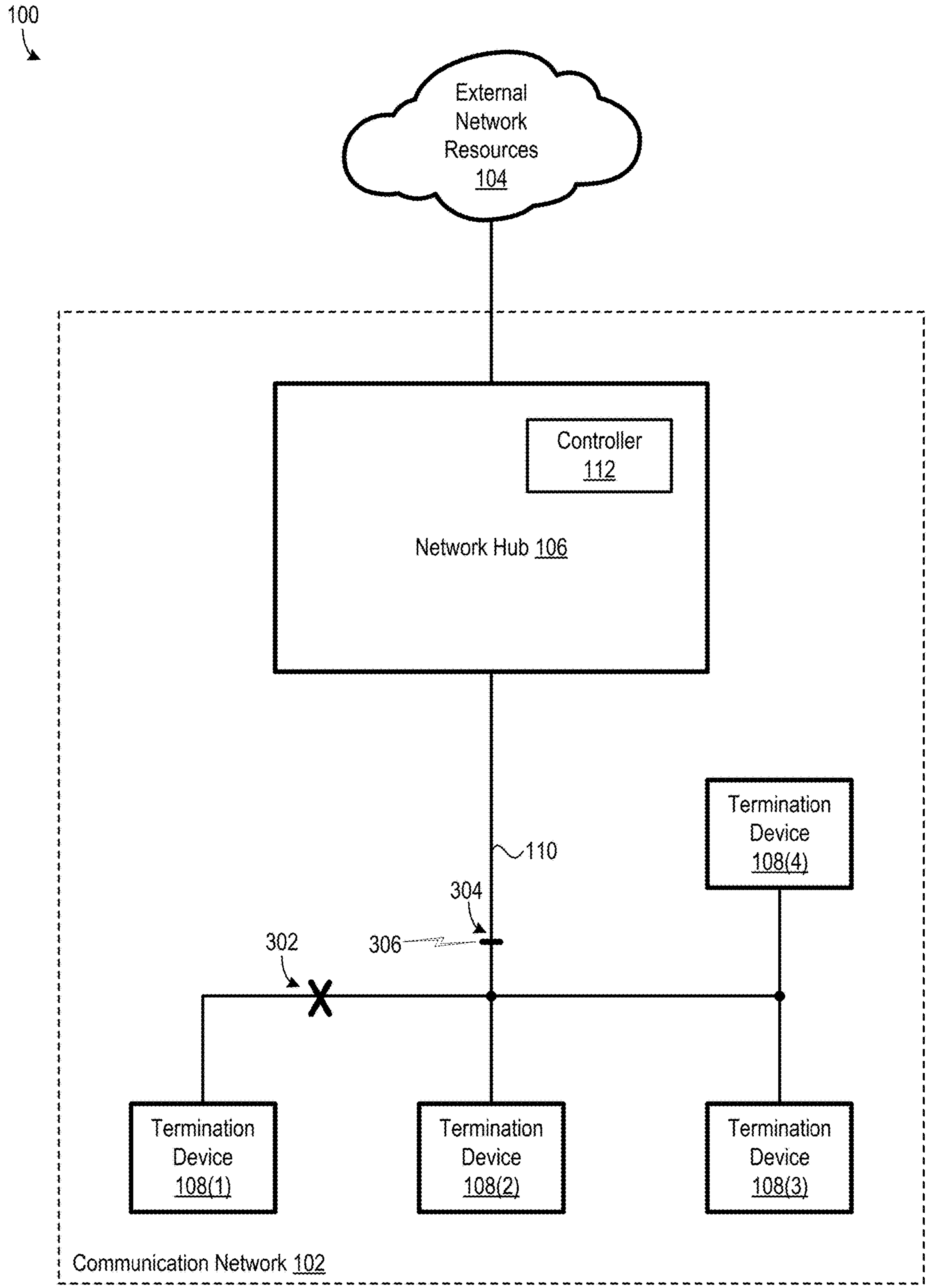
FIG. 3 is a schematic diagram of the FIG. 1 communication environment illustrating two example impairments in communication infrastructure.
Figure 4:
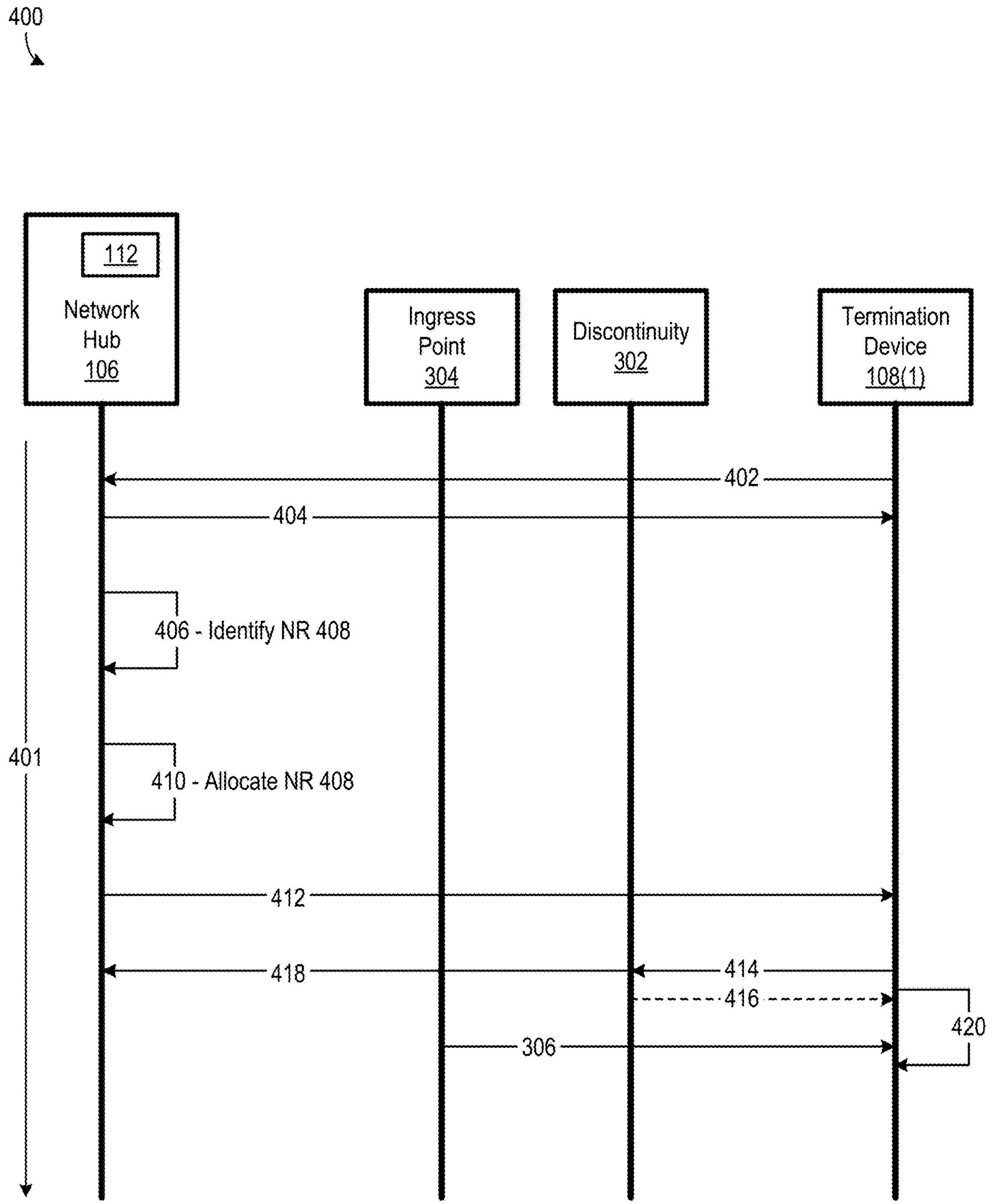
FIG. 4 is a signal flow diagram illustrating examples of signal flows within a communication network of the FIG. 1 communication environment while executing the FIG. 2 method.

FIG. 2 is a flow chart of method 200 for identifying a feature, such as an impairment, in a communication network, which is performed by certain embodiments of communication network 102. In some embodiments, communication network 102 performs method 200 solely during one or more quiet periods of communication network 102, where a quiet period is a period when termination devices 108 are not communicating with network hub 106 via communication infrastructure 110 using frequency ranges that are allocated for feature identification. Method 200 is discussed below with respect to FIG. 3 which illustrates the following example impairments in communication network 102: (i) a discontinuity 302 that is upstream of termination device 108(1) and only affects termination device 108(1) and (ii) an ingress point 304 that allows ingress of signals 306 into communication infrastructure 110. Discontinuity 302 is, for example, an impedance discontinuity in a communication medium of communication infrastructure 110, such as an impedance discontinuity in a coaxial electrical cable, a tap, a power inserter, etc., in embodiments where communication network 102 is a cable communication network. As another example, discontinuity 302 could be a change in index of refraction of an optical communication path in embodiments of communication infrastructure 110 including an optical communication medium. As a further example, discontinuity 302 could be a signal fade in a wireless communication link, such as caused by an obstruction. Ingress point 304 is, for example, an undesired opening in communication infrastructure 110 allowing ingress of signals other than those intended to be carried by communication infrastructure 110, such as signals 306. Method 200 is further discussed below with respect to a signal flow diagram 400 of FIG. 4 which illustrates examples of signal flows within communication network 102 while executing method 200. Signal flow diagram 400 includes vertical lines logically representing each of network hub 106 (including controller 112), termination device 108(1), discontinuity 302, and ingress point 304. Other elements of communication network 102 are not shown in FIG. 4 for illustrative clarity, and FIG. 4 should not be considered as being to scale. An arrow 401 in FIG. 4 represents increasing time in the direction of the arrow.

In a block 202 of method 200, a termination device 108 is selected to perform a feature search in communication network 102 over a predetermined time duration and over a predetermined frequency range of signals in communication infrastructure 110. The predetermined time duration is, for example, a predetermined amount of time or a period spanning a predetermined starting time and a predetermined ending time. In one example of block 202, controller 112 selects termination device 108(1) to perform a feature search in communication network 102 over a predetermined time duration and over a predetermined frequency range, such as based on a predetermined schedule of feature searches or in response to a signal indicating impaired communication between network hub 106 and termination device 108(1). In another example of block 202, termination device 108(1) selects itself to perform a feature search over a predetermined time duration and over a predetermined frequency range, such as in response to a predetermined schedule or in response to termination device 108(1) encountering communication errors when communicating with network hub 106 via communication infrastructure 110.

In a block 204 of method 200, the termination device 108 selected in block 202, henceforth referred to as "the selected termination device 108" when discussing method 200, requests network resources of communication network 102 from controller 112 for the feature search. The requested network resources include, for example, one or more time periods and one or more frequency ranges of signals within communication infrastructure 110 for use by the selected termination device 108 when performing the feature search. For instance, in some embodiments where (i) communication network 102 is a cable communication network, (ii) termination devices 108 are cable modems, and (iii) network hub 106 includes, for example, a CMTS, R-PHY device, or a remote media control layer and remote physical layer (R-MAC-PHY) device, the requested network resources include a request from a cable modem to a controller of the CMTS or R-PHY device for an idle slot in the cable communication network, where the idle slot is a combination of a particular time period and one or more frequency bands that are free of communication signals in communication infrastructure 110. In an alternate embodiment of block 204, controller 112 informs the selected termination device 108 that the selected termination device 108 is to perform a feature search. In one example of block 204, termination device 108(1) sends a message 402 to controller 112 of network hub 106 via communication infrastructure 110, or out-of-band with respect to communication infrastructure 110, requesting network resources to perform a feature search, as illustrated in FIG. 4. In another example of block 204, network hub 106 sends a message 404 to termination device 108(1) via communication infrastructure 110, or out-of-band with respect to communication infrastructure 110, informing termination device 108(1) that it is to perform a feature search, as illustrated in FIG. 4.

In a block 206 of method 200, (i) controller 112 identifies network resources to assign to the selected termination device 108 to perform the feature search, (ii) controller 112 allocates the identified network resources to the selected termination device 108, (iii) controller 112 informs the selected termination device 108 that it has been assigned the identified network resources, and (iv) controller 112 optionally informs other termination devices 108 of the upcoming feature search by the selected termination device 108. The network resources allocated and assigned in block 206 include, for example, one or more time periods and one or more frequency ranges of signals in communication infrastructure 110. In embodiments where communication network 102 is a cable communication network, the network resources assigned to the selected termination device 108 include, for example, one or more idle slots of the cable communication network. In one example of block 206, (i) controller 112 identifies 406 network resources (NR) 408 of communication network 102 for use by termination device 108(1) to perform a feature search, (ii) controller 112 allocates 410 network resources 408 to termination device 108(1), such as by updating a network resource allocation record (not shown) of network hub 106, and (iii) controller 112 sends a message 412 to termination device 108(1) including assignment of network resources 408 to termination device 108(1), as illustrated in FIG. 4.

In a block 208 of method 200, the selected termination device 108 sends one or more transmitted signals into communication infrastructure 110(*i*) during one or more time periods allocated in the assigned network resources and (ii) within one or more frequency ranges allocated in the assigned network resources. The transmitted signals include, for example, calibrated pilot signals and/or communication traffic bearing signals. Additionally, the selected termination device 108 listens for signals, i.e., it monitors communication infrastructure 110 for presence of signals, that are within at least the one or more frequency ranges encompassing the transmitted signals, at least partially during the one or more time periods allocated in the assigned network resources. The one or more transmitted signals may be short duration burst signals. Additionally, the selected termination device 108 may send transmitted signals into communication infrastructure 110 over multiple frequencies, such as according to a pattern of increasing frequencies where transmitted signal frequency increases with increasing time, a pattern of decreasing frequencies where transmitted signal frequency decreases with increasing time, a random pattern where transmitted signal frequency randomly varies with time, or any other pattern where transmitted signal frequency is a function of time. The selected termination device 108 is optionally configured to send a plurality of transmitted signals, e.g., a plurality of calibrated pilot signals and/or communication traffic bearing signals, into communication infrastructure 110 over the time period allocated in the assigned network resources, for example, to help increase accuracy of the feature search, such as by enabling confirmation of reflection signals resulting from an impairment or other network feature, or by enabling comparison of multiple reflection signals resulting from an impairment or other network feature. In one example of block 208, termination device 108(1) sends a transmitted signal 414 into communication infrastructure 110, as illustrated in FIG. 4. A portion of transmitted signal 414 returns to termination device 108(1) via communication infrastructure 110 as a reflection signal 416 in response to transmitted signal 414 encountering discontinuity 302, as also illustrated in FIG. 4. A portion 418 of transmitted signal 414 remaining after generation of reflection signal 416 at discontinuity 302 continues to network hub 106 (and other elements of communication network 102 not shown in FIG. 4) via communication infrastructure 110.

In a block 210 of method 200, the selected termination device 108 monitors communication infrastructure 110 and captures any signals received by the selected termination device 108 during, and optionally after, the one or more times periods allocated in the assigned network resources. The signals captured by the selected termination device 108 in block 210 include, for example, (i) one or more reflection signals resulting from the transmitted signals sent in block 208 encountering one or more impairments or other features in communication infrastructure 110 and/or (ii) ingress of signals into communication infrastructure 110, such as due to defects in communication infrastructure 110. The selected termination device 108 monitors communication infrastructure 110 for signals at least within the one or more frequency ranges allocated in the assigned network resources, in block 210. Additionally, in some embodiments, the selected termination device 108 further monitors communication infrastructure 110 for signals outside of the one or more frequency ranges allocated in the assigned network resources, such as to increase likelihood of detection of a non-linear feature and/or to enable detection of ingress of signals that are outside of the pilot signal frequency ranges. In embodiments where communication network 102 is a cable communication network, the signals captured in block 210 include, for example, radio frequency reflection signals resulting from a feature and/or undesired ingress of radio frequency signals into the cable communication network. In one example of block 210, termination device 108(1) monitors 420 communication infrastructure 110 during one or more times periods allocated in assigned network resources 408, and termination device 108(1) captures (i) reflection signal 416 and (ii) signals 306 from ingress point 304, while termination device 108(1) monitors 420 communication infrastructure 110, as illustrated in FIG. 4.

The signals captured in block 210 may be expressed by the selected termination device 108 in a variety of manners. For example, the captured signals may be expressed as spectrum data (e.g., magnitude as a function of frequency), complex data (e.g., I, Q values), and/or Received Modulation Error Ratio (RxMER) per subcarrier. Additionally, the selected termination device 108 optionally converts any signals captured in block 210 into a form that facilitates processing of the captured signals.

In a block 212 of method 200, the signals captured in block 210 are analyzed to identify one or more impairments or other features of communication infrastructure 110. The analysis of block 212 is performed, for example, by the selected termination device 108, controller 112, and/or one or more other elements that are within, or external to, communication network 102. In one example of block 212, termination device 108(1) and/or controller 112 determine a location of discontinuity 302 with respect to termination device 108(1) along communication infrastructure 110 at least partially using TDR. For instance, in these embodiments, termination device 108(1) and/or controller 112 may divide (i) a difference between a time when termination device 108(1) captures reflection signal 416 and a time when termination device 108(1) sends transmitted signal 414 into communication infrastructure 110 by (ii) propagation velocity of signals through communication infrastructure 110, to determine distance of discontinuity 302 from termination device 108(1). As another example of block 212, termination device 108(1) and/or controller 112 may determine reflection strength of discontinuity 302 by comparing strength of captured reflection signal 416 to strength of transmitted signal 414, where reflection strength of discontinuity 302 increases with decreasing difference between strength of captured reflection signal 416 and strength of pilot signal 414.

As a further example of block 212, termination device 108(1) and/or controller 112 may determine one or more characteristics of discontinuity 302 by (i) converting reflection signal 416 from a time domain to a frequency domain, such as using a Fourier analysis, and (ii) matching a pattern of the frequency domain of reflection signal 416 to a pattern of a known frequency domain corresponding to a particular impairment characteristic. For instance, in embodiments where discontinuity 302 results from water intrusion into a cable, termination device 108(1) and/or controller 112 may determine that discontinuity 302 is characteristic of a water intrusion by (i) converting reflection signal 416 from a time domain to a frequency domain and (ii) matching a pattern of the frequency domain of reflection signal 416 to a pattern of a known frequency domain corresponding to a water impairment.

Reflection signals from a non-linear feature, such as an impairment, may have a different frequency than a transmitted signal, e.g., a pilot signal, ranging signal, sounding signal, or communication bearing traffic signal encountering the non-linear feature. Accordingly, in particular embodiments, termination device 108(1) and/or controller 112 determine that discontinuity 302 is a non-linear impairment by performing the following procedure: (i) comparing frequency of reflection signal 416 to frequency of transmitted signal 414, (ii) determining a difference in time between when termination device 108(1) sends transmitted signal 414 into communication infrastructure 110 and a time when termination device 108(1) receives reflection signal 416, and (ii) determining that discontinuity 302 is a non-linear impairment in response to frequency of reflection signal 416 being different from frequency of transmitted signal 414 by at least a first threshold amount and the determined difference in time being less than a second threshold amount. Additionally, difference in frequency of captured signals 306 from frequency of transmitted signal 414 may indicate that captured signals 306 are ingress signals. Accordingly, in some embodiments, termination device 108(1) and/or controller 112 may determine that captured signals 306 represent ingress into communication infrastructure 110 by performing the following procedure: (i) comparing frequency of captured signals 306 to frequency of transmitted signal 414 and (ii) determining that captured signals 306 are ingress signals in response to frequency of captured signals 306 being different from frequency of transmitted signal 414 by at least a threshold amount. Certain embodiments of communication network 102 further condition determining that captured signals 306 are ingress signals on termination device 108(1) receiving captured signals 306 at least a minimum threshold amount of time after termination device 108(1) sends pilot signal 414 into communication infrastructure 110, to prevent a reflection signal from a non-linear feature being misidentified as an ingress signal.

In embodiments where the selected termination device 108 sends multiple transmitted signals into communication infrastructure 110, the selected termination device 108 may capture multiple corresponding reflection signals due to presence of an impairment or other feature in communication infrastructure 110. In these embodiments, termination device 108(1) and/or controller 112 are optionally further configured to consider multiple reflection signals in block 212. For example, termination device 108(1) and/or controller 112 may determine an average or other mathematical function of multiple captured reflection signals, such as to improve accuracy of analysis in block 212. As another example, termination device 108(1) and/or controller 112 may compare multiple instances of captured reflection signals to determine whether any of the captured reflection signals are outliers, and optionally discard any outlying captured reflection signals, to promote accurate analysis in block 212. As a further example, termination device 108(1) and/or controller 112 may select one or more captured reflection signals considered most likely to be accurate, such as by voting or by a consensus procedure, and optionally discard the remaining reflection signals when performing analysis in block 212.

Figure 5:
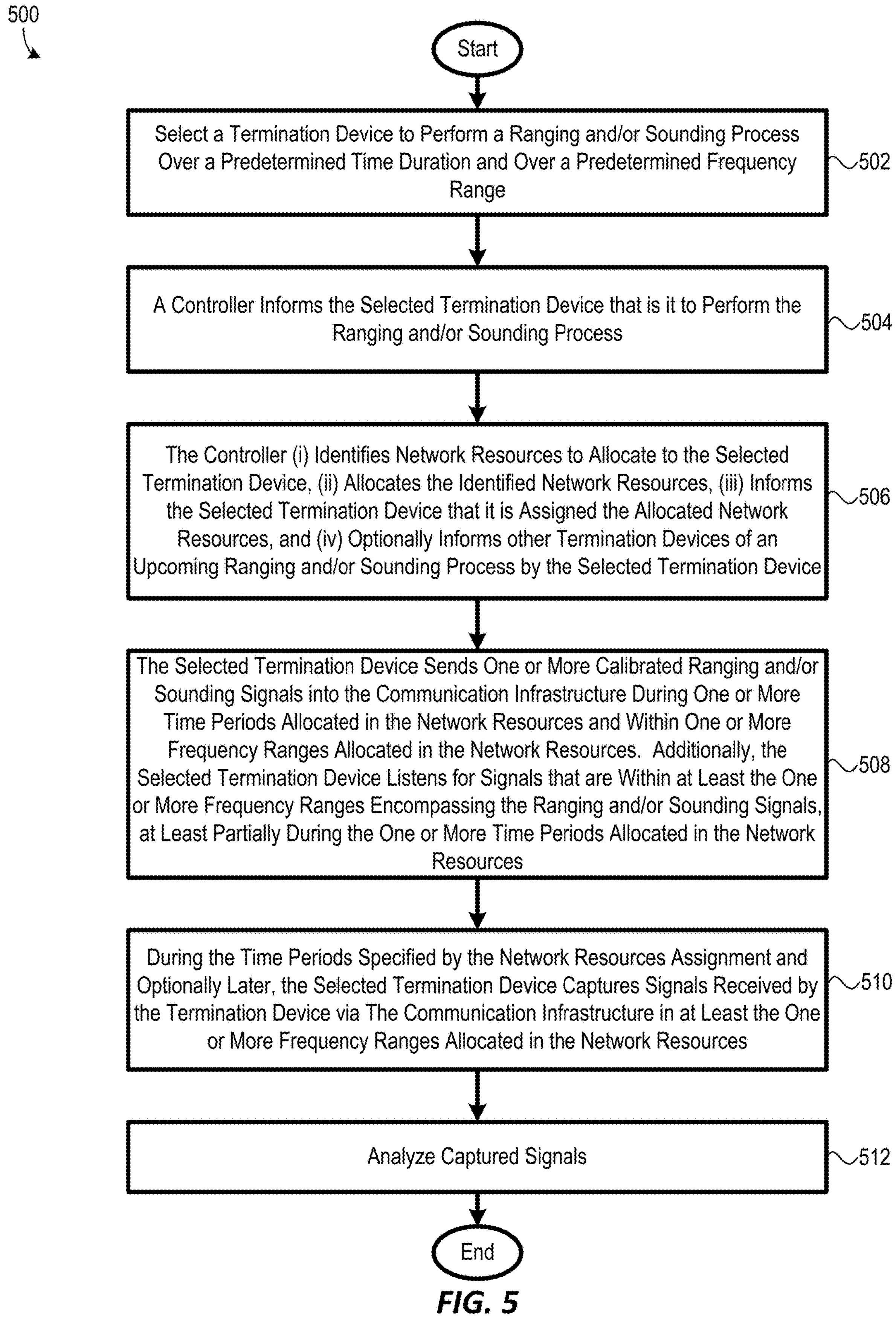
FIG. 5 is a flow chart of another method for identifying a feature in a communication network, according to an embodiment.

FIG. 5 is a flow chart of a method 500 for identifying a feature, such as an impairment, in a communication network which is performed by certain embodiments of communication network 102. Method 500 is discussed below with respect to the example impairments of FIG. 3 as well as with respect to a signal flow diagram 600 of FIG. 6 which illustrates examples of signal flows while executing method 500. Signal flow diagram 600 includes vertical lines logically representing each of network hub 106 (including controller 112), termination device 108(1), discontinuity 302, and ingress point 304. Other elements of communication network 102 are not shown in FIG. 6 for illustrative clarity, and FIG. 6 should not be considered as being to scale. An arrow line 601 in FIG. 4 represents increasing time in a direction of the arrow.

The method of FIG. 5 includes a ranging process and/or a sounding process. A ranging process is a process where a termination device 108 synchronizes itself with network hub 106 by adjusting communication signal timing and power levels. In particular, the termination device 108 sends a ranging request signal to network hub 106, and network hub

106 responds by sending a ranging response signal adjusting the termination device 108's signal timing and signal power as needed. Each of a ranging request signal and a ranging response signal can be referred to as a ranging signal. A sounding process, in turn, is a process where a communication channel between a termination device 108 and network hub 106 is assessed and optimized. The termination device 108 sends a series of sounding transmitted signals, such as Orthogonal Upstream Data Channels (OUDC) signals, to network hub 106. Network hub 106 then analyzes the sounding transmitted signals to evaluate channel quality, and network hub 106 provides a sounding feedback signal to the termination device 108 suggesting adjustments to parameters such as modulation schemes and signal power levels. Each of a sounding transmitted signal and a sounding feedback signal can be referred to as a sounding signal.

Referring to FIG. 5, in a block 502 of method 500, a termination device 108 is selected to perform a ranging and/or sounding process in communication network 102 over a predetermined time duration and over a predetermined frequency range of signals in communication infrastructure 110. The predetermined time duration is, for example, a predetermined amount of time or a period spanning a predetermined starting time and a predetermined ending time. In one example of block 502, controller 112 selects termination device 108(1) to perform a ranging and/or sounding process in communication network 102 over a predetermined time duration and over a predetermined frequency range, such as based on a predetermined schedule or in response to a signal indicating impaired communication between network hub 106 and termination device 108(1).

Figure 6:
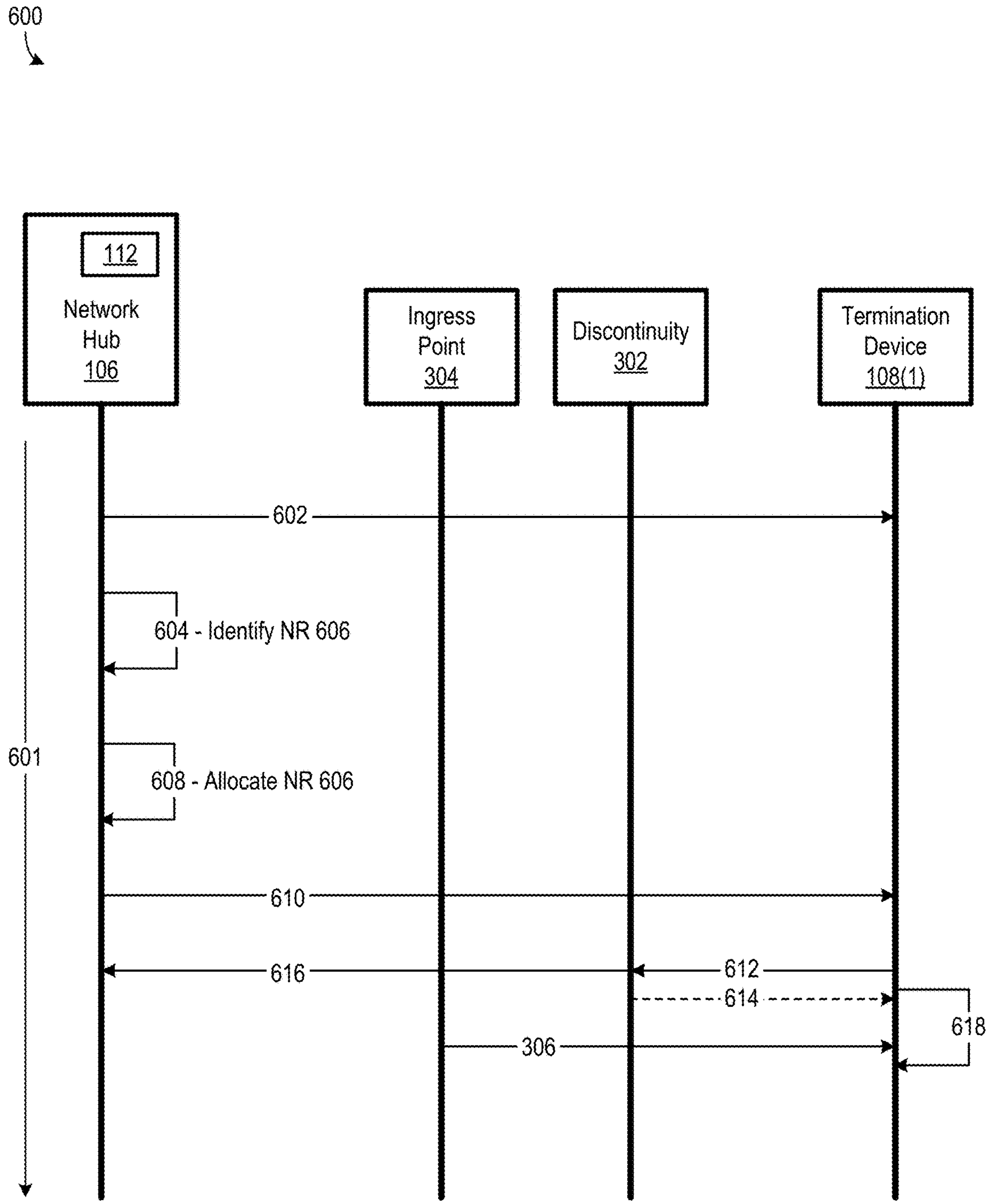
FIG. 6 is a signal flow diagram illustrating examples of signal flows within the communication network of the FIG. 1 communication environment while executing the FIG. 5 method.

In a block 504 of method 500, controller 112 informs the termination device 108 selected in block 502, henceforth referred to as "the selected termination device 108" when discussing method 500, that the selected termination device 108 is to perform a ranging and/or sounding process. In one example of block 504, network hub 106 sends termination device 108(1) a message 602 informing termination device 108(1) that the termination device 108(1) is to perform a ranging and/or sounding process, as illustrated in FIG. 6. In a block 506 of method 500, (i) controller 112 identifies network resources to assign to the selected termination device 108 to perform the ranging and/or sounding process, (ii) controller 112 allocates the identified network resources to the selected termination device 108, (iii) controller 112 informs the selected termination device 108 that it has been assigned the identified network resources, and (iv) controller 112 optionally informs other termination devices 108 of the upcoming ranging and/or sounding process by the selected termination device 108. The network resources allocated and assigned in block 506 include, for example, one or more time periods and one or more frequency ranges of signals in communication infrastructure 110. In one example of block 506, (i) controller 112 identifies 604 network resources 606 of communication network 102 for use by termination device 108(1) to perform a ranging and/or sounding process, (ii) controller 112 allocates 608 network resources 606 to termination device 108(1), such as by updating a network resource allocation record (not shown) of network hub 106, and (iii) controller 112 sends a message 610 to termination device 108(1) including assignment of network resources 606 to termination device 108(1), as illustrated in FIG. 6.

In a block 508 of method 500, the selected termination device 108 sends one or more calibrated ranging and/or sounding signals into communication infrastructure 110 (*i*) during one or more times periods allocated in the assigned network resources and (ii) within one or more frequency ranges allocated in the assigned network resources. Additionally, the selected termination device 108 listens for signals, i.e., it monitors communication infrastructure 110 for presence of signals, that are within at least the one or more frequency ranges encompassing the ranging and/or sounding signals, at least partially during the one or more time periods allocated in the assigned network resources. In one example of block 508, termination device 108(1) sends a calibrated ranging or sounding signal 612 into communication infrastructure 110, as illustrated in FIG. 6. A portion of ranging or sounding signal 612 returns to termination device 108(1) via communication infrastructure 110 as a reflection signal 614 in response to ranging or sounding signal 612 encountering discontinuity 302, as also illustrated in FIG. 6. A portion 616 of ranging or sounding signal 612 remaining after generation of reflection signal 614 at discontinuity 302 continues to network hub 106 (and other elements of communication network 102 not shown in FIG. 6) via communication infrastructure 110.

In a block 510 of method 500, the selected termination device 108 monitors communication infrastructure 110 and captures any signals received by the selected termination device 108 during, and optionally after, the one or more times periods allocated in the assigned network resources. The signals captured by the selected termination device 108 in block 510 include, for example, (i) one or more reflection signals resulting from the ranging and/or sounding signals sent in block 508 encountering one or more features, such as impairments, in communication infrastructure 110 and/or (ii) ingress of signals into communication infrastructure 110, such as due to defects in communication infrastructure 110. The selected termination device 108 monitors communication infrastructure 110 for signals at least within the one or more frequency ranges allocated in the assigned network resources, in block 510. Additionally, in some embodiments, the selected termination device 108 further monitors communication infrastructure 110 for signals outside of the one or more frequency ranges allocated in the assigned network resources, such as to increase likelihood of detection of a non-linear feature and/or to enable detection of ingress of signals that are outside of the ranging or sounding signal frequency ranges.

In embodiments where communication network 102 is a cable communication network, the signals captured in block 510 include, for example, radio frequency reflection signals resulting from a network feature and/or undesired ingress of radio frequency signals into the cable communication network. The signals captured in block 510 may be expressed by the selected termination device 108 in a variety of manners. For example, the captured signals may be expressed as spectrum data (e.g., magnitude as a function of frequency), complex data (e.g., I, Q values), and/or RxMER per subcarrier. Additionally, the selected termination device 108 optionally converts any signals captured in block 510 into a form that facilitates processing of the captured signals. In one example of block 510, termination device 108(1) monitors 618 communication infrastructure 110 during one or more time periods allocated in assigned network resources 606, and termination device 108(1) captures (i) reflection signal 614 and (ii) signals 306 from ingress point 304, while termination device 108(1) monitors 618 communication infrastructure 110, as illustrated in FIG. 6.

In a block 512 of method 500, the signals captured in block 510 are analyzed to identify one or more features, including but not limited to impairments, of communication infrastructure 110. The analysis of block 512 is performed, for example, by the selected termination device 108, controller 112, and/or one or more other elements that are within, or external to, communication network 102. In one example of block 512, termination device 108(1) and/or controller 112 analyze reflection signal 614 using a method similar to one or more of the analysis methods discussed above with respect to block 212 of method 200 but with (i) transmitted signal 414 replaced with ranging or sounding signal 612 and (ii) reflection signal 416 replaced with reflection signal 614. As another example of block 512, termination device 108(1) and/or controller 112 analyze signals 306 to determine ingress using a method similar to that discussed above with respect to block 212 of method 200.

Figure 7:
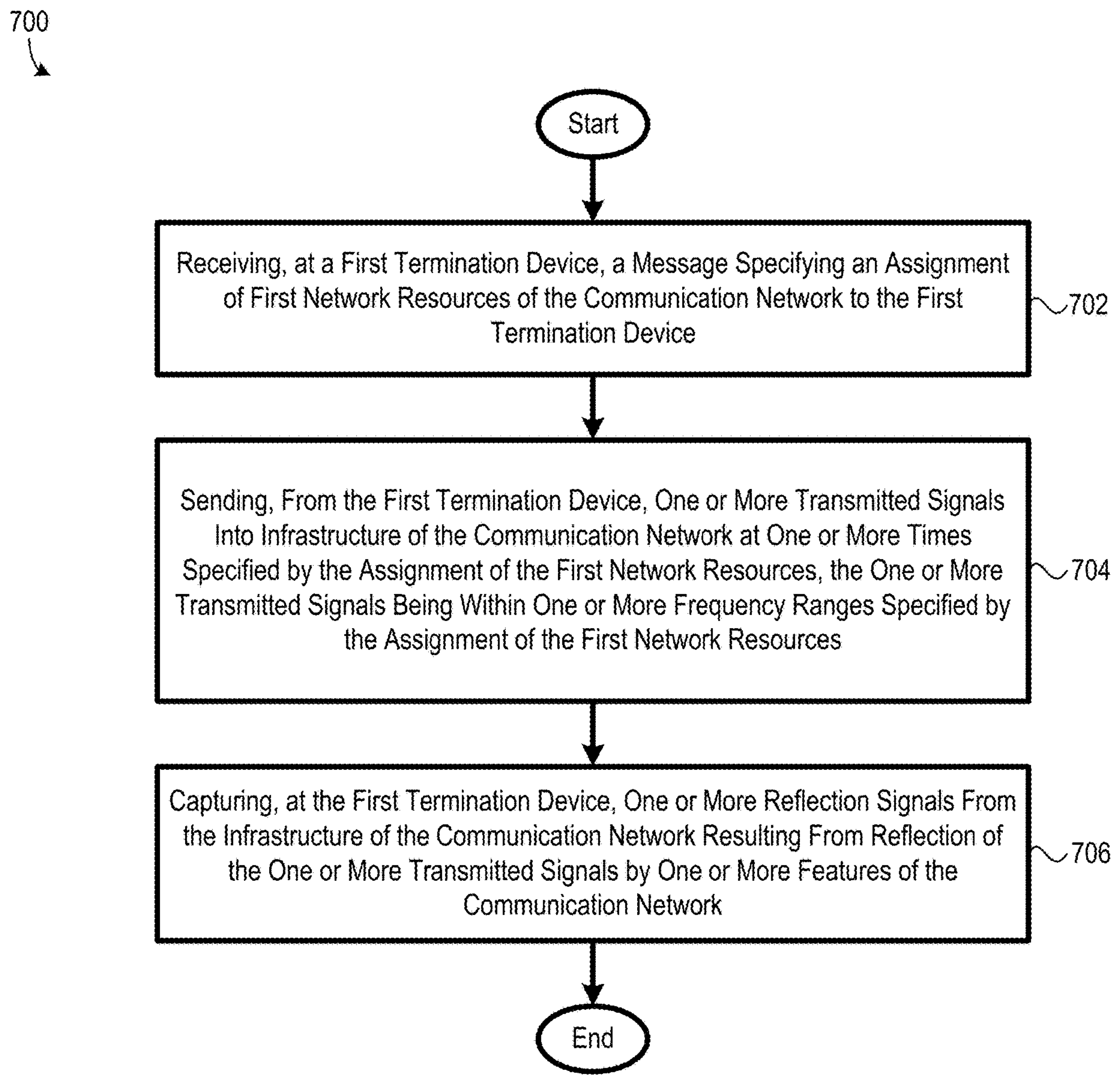
FIG. 7 is a flow chart of an additional method for identifying a feature in a communication network, according to an embodiment.

FIG. 7 is a flow chart of method 700 for identifying a feature, such as an impairment, in a communication network, which is performed by certain embodiments of communication network 102. In a block 702 of method 700, a termination device 108 receives a message specifying an assignment of first network resources of the communication network to the first termination device. In one example of block 702, termination device 108(1) receives message 412 including assignment of network resources 408, as illustrated in FIG. 4. As another example of block 702, termination device 108(1) receives message 610 including assignment of network resources 606 to termination device 108(1), as illustrated in FIG. 6.

In a block 704 of method 700, the termination device 108 of block 702 sends one or more transmitted signals into infrastructure of the communication network at one or more times specified by the assignment of the first network resources, where the one or more transmitted signals are within one or more frequency ranges specified by the assignment of the first network resources. The one or more transmitted signals include, for example, a calibrated pilot signal, a ranging signal, a sounding signal, and/or communication traffic bearing signals. In one example of block 704, termination device 108(1) sends transmitted signal 414 into communication infrastructure 110, as illustrated in FIG. 4. As another example, of block 704, termination device 108 (1) sends ranging or sounding signal 612 into communication infrastructure 110, as illustrated in FIG. 6.

In a block 706 of method 700, the termination device 108 of blocks 702 and 704 captures one or more reflection signals from the infrastructure of the communication network resulting from reflection of the one or more transmitted signals by one or more features, such as impairments, of the communication network. In one example of block 706, termination device 108(1) captures reflection signal 416, as illustrated in FIG. 4. In another example of block 706, termination device 108(1) captures reflection signal 614, as illustrated in FIG. 6. The signals captured in block 706 may be expressed by the termination device 108 in a variety of manners. For example, the captured signals may be expressed as spectrum data (e.g., magnitude as a function of frequency), complex data (e.g., I, Q values), and/or RxMER per subcarrier. Additionally, the termination device 108 optionally converts any signals captured in block 706 into a form that facilitates processing of the captured signals.

Method 700 optionally proceeds from block 706 to an additional block (not shown) where the termination device that captured the one or more reflection signals in block 706, and/or controller 112, analyze the captured reflection signals, such as using TDR or another feature identification technique. For example, in certain embodiments, the termination device 108 and/or controller 112 perform one or more the analysis methods discussed above with respect to block 212 of method 200 using the one or more reflection signals captured in block 706.

Figure 8:
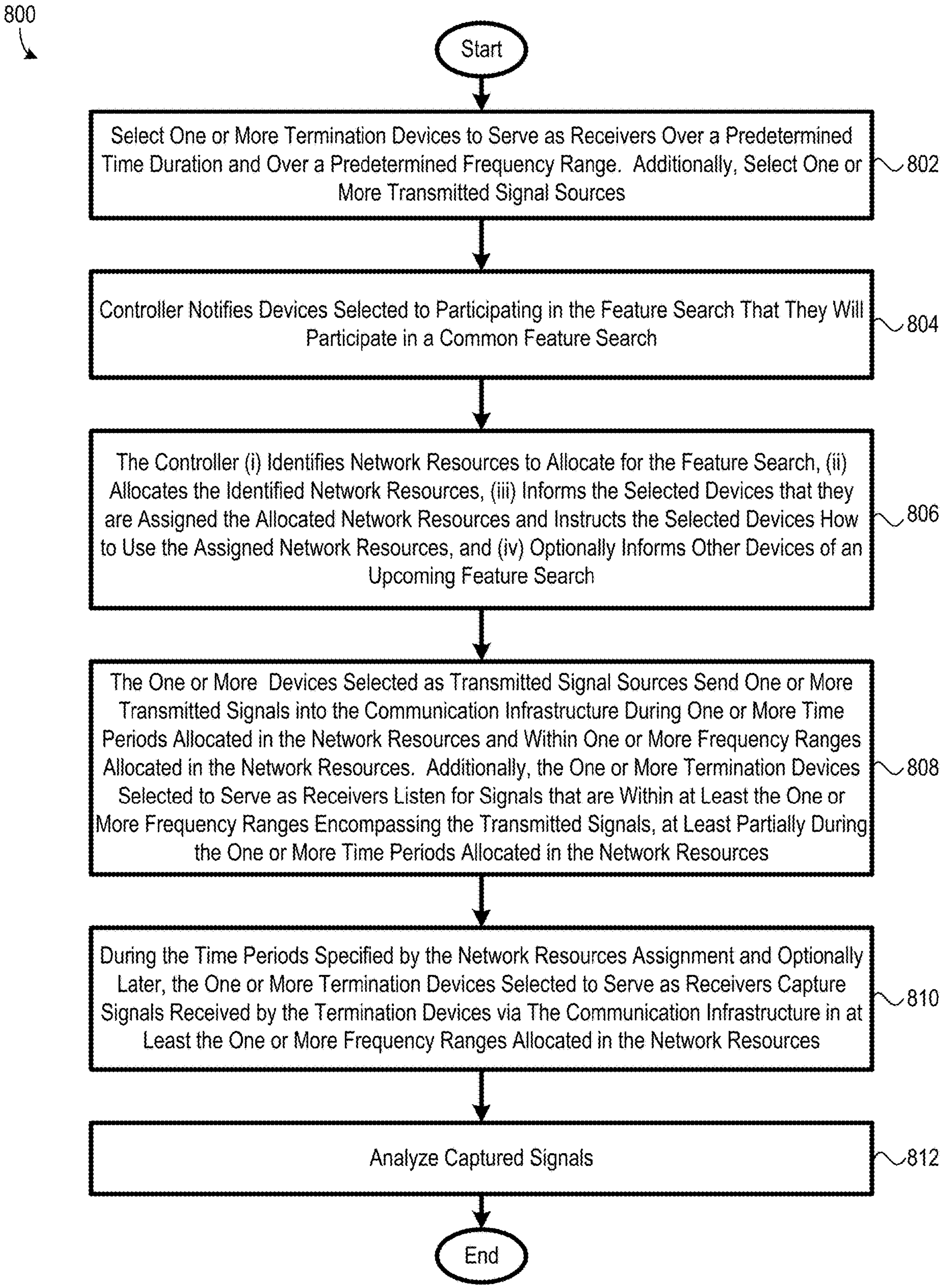
FIG. 8 is a flow chart of another method for identifying a feature in a communication network, according to an embodiment.

Referring again to FIG. 1, certain embodiments of communication network 102 are configured such that at least two termination devices 108 monitor communication infrastructure 110 for presence of signals, such as signals reflected by an impairment or other feature in communication infrastructure 110 or ingress signals, to identify an impairment or other feature in communication network 102. For example, FIG. 8 is a flow chart of a method 800 for identifying a feature, such as an impairment, in a communication network, which is performed by certain embodiments of communication network 102. Method 800 is discussed below with respect to the example impairments of FIG. 3 as well as with respect to a signal flow diagram 900 of FIG. 9 which illustrates examples of signal flows while executing method 800. Signal flow diagram 900 includes vertical lines logically representing each of network hub 106 (including controller 112), termination device 108(2), termination device 108(3), termination device 108(4), and discontinuity 302. Other elements of communication network 102 are not shown in FIG. 9 for illustrative clarity, and FIG. 9 should not be considered as being to scale. An arrow 901 in FIG. 9 represents increasing time in the direction of the arrow.

In a block 802 of method 800, one or more termination device 108 are selected to serve as receivers over a predetermined time duration and over a predetermined frequency range, to perform a feature search. Additionally, one or more transmitted signal sources are selected in block 802 to provide one or more transmitted signals (e.g., a calibrated pilot signal, a ranging signal, a sounding signal, and/or communication traffic bearing signals) for the feature search. The transmitted signal sources are, for example, one or more of the termination devices 108 selected to serve as receivers, one or more termination devices 108 not selected to serve as receivers, network hub 106, and/or an optional signal generator (not shown), such as a stand-alone signal generator connected to communication infrastructure 110. In some embodiments, controller 112 causes termination devices 108 of communication network 102 to perform a ranging process and/or a sounding process to identify groups of termination devices 108 that are within communication range of each other via communication infrastructure 110. Identification of groups of termination devices that are within communication range of each other may then be used to select devices in block 802 to ensure that all selected devices are in communication range of each other. For example, controller 112 may select in block 802 solely devices (e.g., termination devices 108) from a single group of devices that are within communication range of each other, as determined by a ranging process and/or a sounding process. In one example of block 802, termination devices 108(2) and 108(3) are selected to serve as receivers, and termination device 108(4) is selected to serve as a transmitted signal source.

In a block 804 of method 800, controller 112 notifies the devices selected in block 802, henceforth referred to as "selected devices" in the method 800 discussion, that they will participate in a common feature search. In one example of block 804, (i) controller 112 sends a message 902 to termination device 108(2) notifying termination device 108 (2) that it will participate in the feature search along with termination devices 108(3) and 108(4), (ii) controller 112 sends a message 904 to termination device 108(3) notifying termination device 108(3) that it will participate in the feature search along with termination devices 108(2) and

Figure 9:
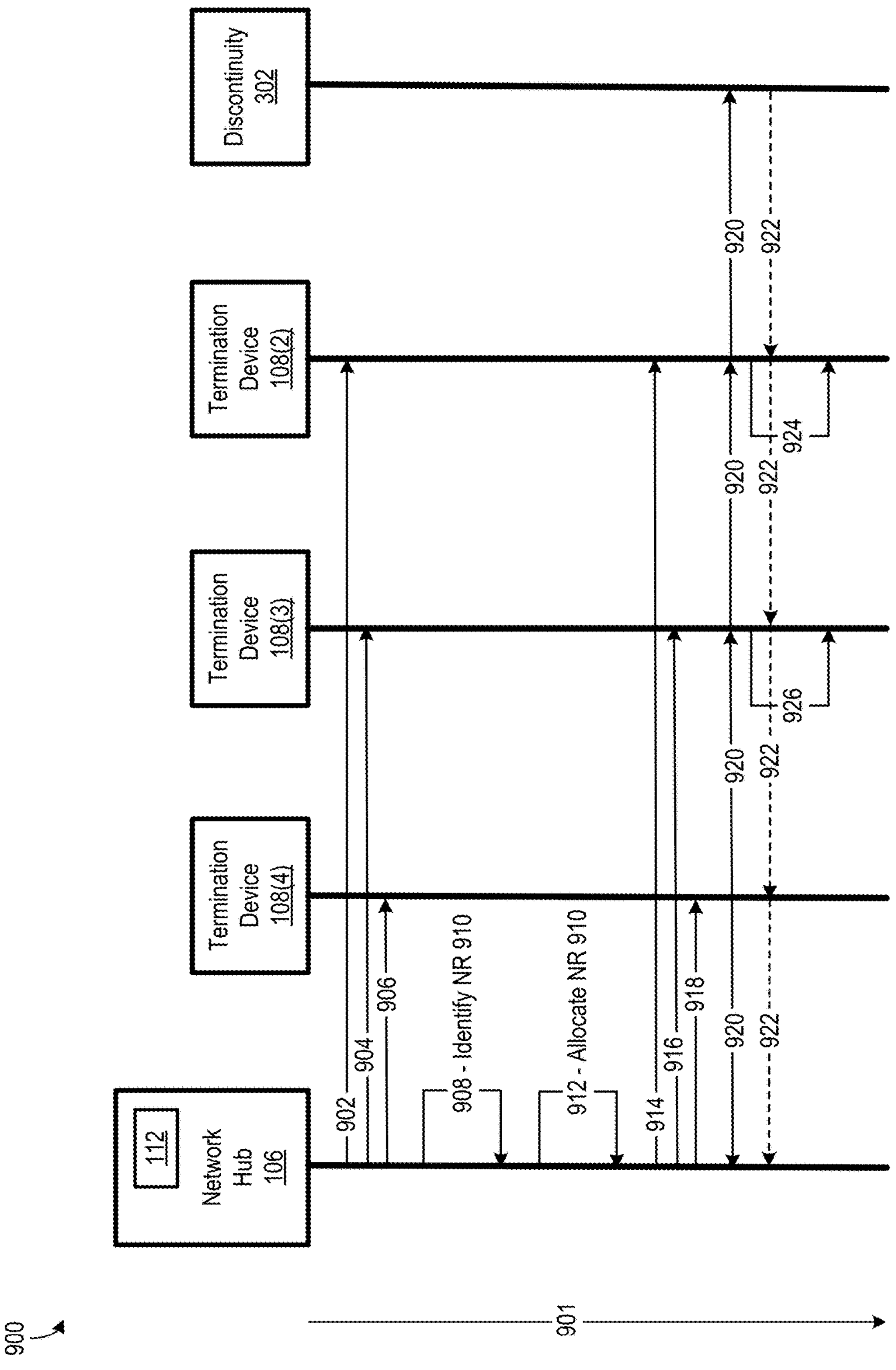
FIG. 9 is a signal flow diagram illustrating examples of signal flows within the communication network of the FIG. 1 communication environment while executing the FIG. 8 method.

108(4), and (iii) controller 112 sends a message 906 to termination device 108(4) notifying termination device 108 (4) that it will participate in the feature search along with termination devices 108(3) and 108(2), as illustrated in FIG. 9. In another example of block 804, controller 112 sends a common message (not shown) to each of termination devices 108(2), 108(3), and 108(4) notifying these three termination devices that they will participate in the feature search.

In a block 806 of method 800, (i) controller 112 identifies network resources to assign to the selected devices, (ii) controller 112 allocates the identified network resources to the selected devices, (iii) controller 112 informs the selected devices that they have been assigned the identified network resources, (iv) controller 112 instructs the selected termination devices how to use the assigned network resources in the feature search, and (v) controller 112 optionally informs other devices (e.g., non-selected termination devices 108) of the upcoming feature search. The network resources allocated and assigned in block 806 include, for example, one or more time periods and one or more frequency ranges of signals in communication infrastructure 110. In embodiments where communication network 102 is a cable communication network (e.g., including coaxial electrical cables or a hybrid of optical cables and coaxial electrical cables), the network resources assigned in block 806 include, for example, one or more idle slots of the cable communication network. Controller 112 instructs the selected termination devices how to use the assigned network resources, by example, by (i) instructing the one or more devices selected to serve as receivers to monitor communication infrastructure 110 for signals over one or more time periods, and within one or more frequency ranges, specified in the assigned network resources, and (ii) instructing the one or more devices selected to serve as transmitted signal sources to send one or more transmitted signals into communication infrastructure 110 over the one or more time periods, and within the one or more frequency ranges, specified in the assigned network resources.

In one example of block 806, (i) controller 112 identifies 908 network resources (NR) 910 of communication network 102 to allocate for the feature search, (ii) controller 112 allocates 912 network resources 910 to the selected devices, such as by updating a network resource allocation record (not shown) of network hub 106, (iii) controller 112 sends messages 914, 916, and 918 to termination devices 108(2), 108(3), and 108(4), respectively, including assignment of network resources 910 to termination devices 108(2), 108 (3), and 108(4), as illustrated in FIG. 9. Messages 914 and 916 also instruct termination devices 108(2) and 108(3), respectively, to monitor communication infrastructure 110 for signals over one or more time periods, and within one or more frequency ranges, specified in the network resources 910. In some alternate embodiments, messages 914 and 916 additionally instruct termination devices 108(2) and 108(3), respectively, to monitor communication infrastructure 110 for signals outside of the one or more frequency ranges specified in the network resources 910, such as to enable identification of a non-linear feature, e.g., a non-linear impairment, and/or ingress of signals into communication infrastructure 110. Additionally, message 918 instructs termination device 108(4) to send one or more transmitted signals into communication infrastructure 110 over the one or more time periods, and within the one or more frequency ranges, specified in network resources 910.

In a block 808 of method 800, the one or more devices selected to serve as transmitted signal sources send one or more transmitted signals (e.g., pilot signals, ranging signals, sounding signals, and/or communication traffic bearing signals) into communication infrastructure 110 (*i*) during one or more times periods allocated in the assigned network resources and (ii) within one or more frequency ranges allocated in the assigned network resources. Additionally, the one or more termination devices 108 selected to serve as receivers listen for signals, i.e., they monitor communication infrastructure 110 for presence of signals, that are within at least the one or more frequency ranges encompassing the transmitted signals, at least partially during the one or more time periods allocated in the assigned network resources. In a manner similar to that discussed above with respect to block 208 of method 200, the one or more transmitted signals may be short duration burst signals. Additionally, the devices selected to serve as transmitted signal sources may send transmitted signals into communication infrastructure 110 over multiple frequencies, such as according to a pattern of increasing frequencies where transmitted signal frequency increases with increasing time, a pattern of decreasing frequencies where transmitted signal frequency decreases with increasing time, a random pattern where transmitted signal frequency randomly varies with time, or any other pattern where transmitted signal frequency is a function of time. The devices selected to serve as transmitted signal sources are optionally configured to send a plurality of transmitted signals into communication infrastructure 110 over the time period allocated in the assigned network resources, for example, to help increase accuracy of the feature search, such as by enabling confirmation of reflection signals resulting from a feature or by enabling comparison of multiple reflection signals resulting from a feature.

In one example of block 808, termination device 108(4) sends a transmitted signal 920 into communication infrastructure 110, as illustrated in FIG. 9. Transmitted signal 920 reaches network hub 106, termination devices 108(3), and termination device 108(2), as illustrated in FIG. 9. However, transmitted signal 920 encounters discontinuity 302 before reaching termination device 108(1) (not shown in FIG. 9), resulting in generation of reflection signal 922, as illustrated in FIG. 9. Network hub 106, termination device 108(2), termination device 108(3), and termination device 108(4) subsequently receive reflection signal 922 via communication infrastructure 110.

In a block 810 of method 800, the termination devices 108 selected to serve as receivers monitor communication infrastructure 110 and capture any signals received by the termination devices 108 during, and optionally after, the one or more times periods allocated in the assigned network resources. The signals captured by the termination devices 108 selected to serve as receivers in block 810 include, for example, (i) one or more reflection signals resulting from the one or more transmitted signals sent in block 808 encountering one or more features, such as impairments, in communication infrastructure 110 and/or (ii) ingress of signals into communication infrastructure 110, such as due to defects in communication infrastructure 110. The termination devices 108 selected to serve as receivers monitor communication infrastructure 110 for signals at least within the one or more frequency ranges allocated in the assigned network resources, in block 810. Additionally, in some embodiments, the termination devices 108 selected to serve as receivers further monitor communication infrastructure 110 for signals outside of the one or more frequency ranges allocated in the assigned network resources, such as to increase likelihood of detection of a non-linear feature and/or to enable detection of ingress of signals that are outside of the transmitted signal frequency ranges. In embodiments where communication network 102 is a cable communication network, the signals captured in block 810 include, for example, radio frequency reflection signals resulting from a network feature and/or undesired ingress of radio frequency signals into the cable communication network. In one example of block 810, (i) termination device 108(2) monitors 924 communication infrastructure 110 during one or more times periods allocated in assigned network resources 910 and captures reflection signal 922 and (ii) termination device 108(3) monitors 926 communication infrastructure 110 during one or more times periods allocated in assigned network resources 910 and captures reflection signal 922, as illustrated in FIG. 9. It should be noted that characteristics of captured reflection signal 922 may vary between termination devices 108(2) and 108(3) due to their different respective locations among communication infrastructure 110.

The signals captured in block 810 may be expressed by termination devices 108 in a variety of manners. For example, the captured signals may be expressed as spectrum data (e.g., magnitude as a function of frequency), complex data (e.g., I, Q values), and/or RxMER per subcarrier. Additionally, the one or more termination devices 108 capturing signals in block 810 optionally convert the signals into a form that facilitates processing of the captured signals.

In a block 812 of method 800, the signals captured in block 810 are analyzed to identify one or more features, such as impairments, of communication infrastructure 110. The analysis of block 810 is performed, for example, by one or more selected termination device 108, controller 112, and/or one or more other elements that are within, or external to, communication network 102. For example, in certain embodiments, one or more termination devices 108 and/or controller 112 analyze a reflection signal captured in block 810 using a method similar to one or more of the analysis methods discussed above with respect to block 212 of method 200, but with reflection signal 416 replaced with a reflection signal captured in block 810. As another example, in certain embodiments, one or more termination devices 108 and/or controller 112 may determine that a signal captured in block 810 corresponds to an ingress signal using a procedure similar to that discussed above with respect to block 212 of FIG. 2 by (i) substituting transmitted signal 414 with a transmitted signal sent in block 808 and (ii) and signals 306 with signals captured in block 810.

It should be noted that signals may be captured by two or more terminations devices 108 in block 810. Respective signals captured by different termination devices 108 may be separately analyzed or they may be jointly analyzed. Respective signals captured by two or more termination devices in block 810 may correspond to a common feature, such as a common discontinuity or a common ingress point, such as in the example of FIG. 9 where reflection signals 922 captured by termination devices 108(2) and 108(3) correspond to common discontinuity 302. Alternately, respective signals captured by two or more termination devices in block 810 may correspond to different respective network features. Accordingly, in particular embodiments, controller 112 and/or one or more termination devices 108 are configured to compare, such as using a pattern matching procedure, respective signals captured by two or more termination devices 108 at a common time, or captured by two or more termination devices 108 within a particular time frame, to determine one or more similarity values representing similarity of each of the captured signals to each of the other captured signals. In these embodiments, controller 112 and/or one or more termination devices 108 are configured to (i) determine that the captured signals correspond to a common feature in communication infrastructure 110 in response to the one or more similarity values being at least a predetermined threshold value and (ii) determine that the captured signals correspond to different respective features in communication infrastructure 110 in response to the one or more similarity values being less than the predetermined threshold value.

Determination of whether respective signals captured by two or more termination devices 108 in block 810 correspond to a common feature may facilitate locating the feature. For example, if respective signals captured by two or more termination devices 108 correspond to a common feature, the feature would necessarily be in a portion of communication infrastructure 110 serving each of the termination devices 108 capturing signals in block 810. Conversely, if respective signals captured by two or more termination devices 108 in block 810 do not correspond to different respective features, portions of communication infrastructure 110 serving all of the termination devices 108 could potentially be ruled out as possible locations of the features. Additionally, determination of whether respective signals captured by two or more termination devices 108 correspond to a common feature may be used to determine likelihood of the termination devices 108 being close to each other in communication infrastructure 110. Specifically, if the respective signals captured by two or more termination devices 108 in block 810 correspond to a common feature, it may be concluded that the termination devices 108 are likely relatively close to each other in communication infrastructure 110. On the other hand, if the respective signals captured by two or more termination devices 108 in block 810 do not correspond to a common feature, it may be concluded that the termination devices 108 are not necessarily close to each other in communication infrastructure 110.

In cases where respective signals captured by two or more termination devices 108 in block 810 correspond to a common feature, such as a common discontinuity, controller 112 and/or one or more termination devices 108 may determine a respective distance from each termination device 108 to the common feature using a TDR procedure. For instance, controller 112 and/or one or more termination devices 108 may determine a respective distance from each termination device 108(2) and 108(3) to discontinuity 302 in the FIG. 9 example by performing a TDR procedure. In particular, controller 112 and/or one or more termination devices 108 may determine distance of discontinuity 302 from termination device 108(2) by dividing (i) a difference between a time when termination device 108(2) receives reflection signal 922 and a time when termination device 108(2) receives transmitted signal 920 by (ii) propagation velocity of signals along communication infrastructure 110. Similarly, controller 112 and/or one or more termination devices 108 may determine distance of discontinuity 302 from termination device 108(3) by dividing (i) a difference between a time when termination device 108(3) receives reflection signal 922 and a time when termination device 108(3) receives transmitted signal 920 by (ii) propagation velocity of signals along communication infrastructure 110. Controller 112 and/or one or more termination devices 108 may estimate a location of a feature in communication infrastructure 110 via triangulation using respective distances of multiple termination devices 108 from the feature.

Additionally, in cases where respective signals captured by two or more termination devices 108 in block 810 correspond to a common feature in the form of a common ingress point, controller 112 and/or one or more termination devices 108 may determine a relative distance from each termination device 108 to the common ingress point from difference between respective times that each termination device 108 captures ingress signals. For example, controller 112 and/or one or more termination devices 108 may determine that a first termination device 108 is closer to the common ingress point than a second termination device 108 in response to the first termination device 108 capturing ingress signals from the common ingress point before the second termination device 108 captures ingress signals from the common ingress point. As another example, controller 112 and/or one or more termination devices 108 may determine that a first termination device 108 is further from the common ingress point than a second termination device 108 in response to the first termination device 108 capturing ingress signals from the common ingress point after the second termination device 108 captures ingress signals from the common ingress point.

Figure 10:
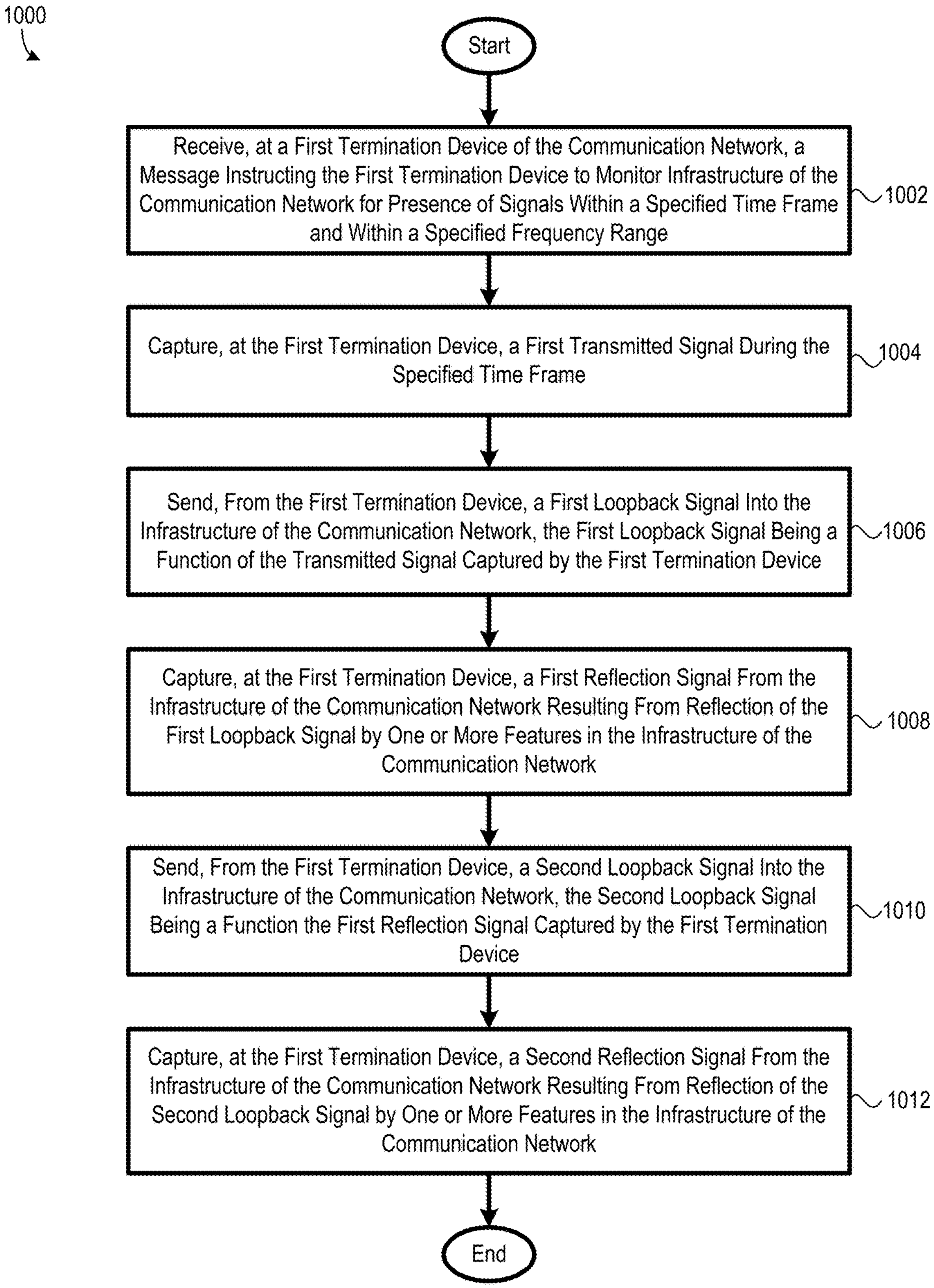
FIG. 10 is a flow chart of an additional method for identifying a feature in a communication network, according to an embodiment.
Figure 11:
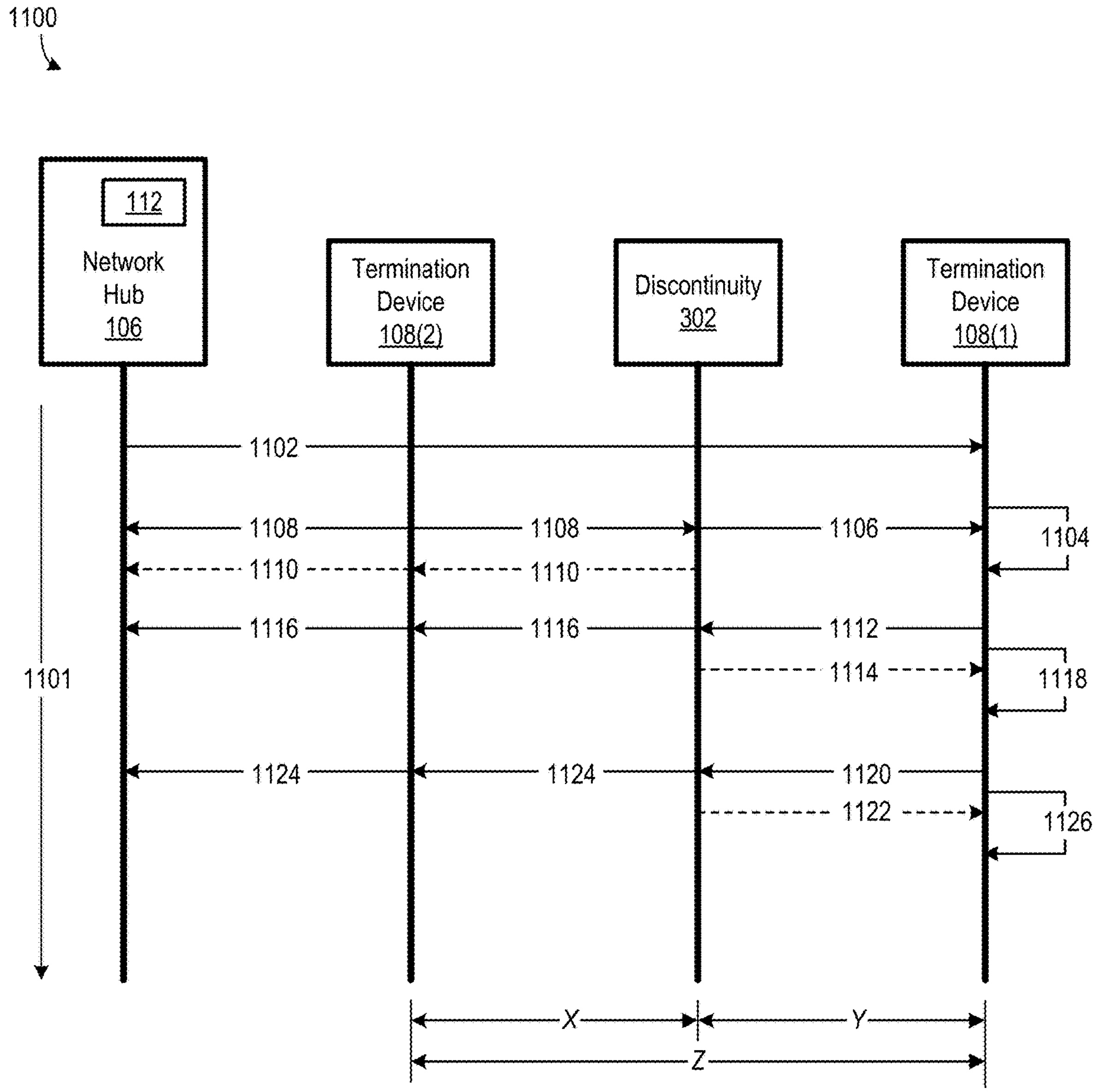
FIG. 11 is a signal flow diagram illustrating examples of signal flows within the communication network of the FIG. 1 communication environment while executing the FIG. 10 method.

Referring again to FIG. 1, certain embodiments of communication network 102 are configured such that at least one termination device 108 is capable of effectively reflecting signals that it captures from communication infrastructure 110 back into communication infrastructure 110 as loopback signals, to further support identification of a feature in communication network 102. For example, FIG. 10 is a flow chart of a method 1000 for identifying a feature in a communication network, which is performed by certain embodiments of communication network 102 including a termination device 108 that is configured to effectively reflect a received signal. Method 1000 is discussed below with respect to the example impairments of FIG. 3, although it is understood that method 1000 could be used to identify other impairments. Method 1000 is additionally discussed with respect to a signal flow diagram 1100 of FIG. 11, which illustrates examples of signal flows while executing method 1000. Signal flow diagram 1100 includes vertical lines logically representing each of network hub 106 (including controller 112), termination device 108(1), termination device 108(2), and discontinuity 302. Other elements of communication network 102 are not shown in FIG. 11 for illustrative clarity, and FIG. 11 should not be considered as being to scale. An arrow 1101 in FIG. 11 represents increasing time in the direction of the arrow.

In a block 1002 of method 1000, a first termination device 108 receives a message instructing the first termination device to monitor communication network infrastructure for presence of signals within a specified time range and within a specified frequency range. As one example of block 1002, termination device 108(1) receives a message 1102 from controller 112 instructing termination device 108(1) to monitor communication infrastructure 110 for presence of signals within a specified time range and within a specified frequency range, as illustrated in FIG. 11.

In a block 1004 the first termination device captures a first transmitted signal, such as a pilot signal, a ranging signal, a sounding signal, or a communication traffic bearing signal, during the time frame specified in the message of block 1002. In one example of block 1004, termination device 108(1) monitors 1104 communication infrastructure 110 during the time range specified in message 1102 and captures a transmitted signal 1106 while monitoring 1104 communication infrastructure 110, as illustrated in FIG. 11. While outside the scope of block 1004, FIG. 11 illustrates termination device 108(2) sending a transmitted signal 1108 into communication infrastructure 110 where (i) a portion of transmitted signal 1108 is reflected back to termination device 108(2), and other elements of communication network 102, as a reflection signal 1110, and (ii) a remaining portion of transmitted signal 1108 continues to termination device 108(1) as transmitted signal 1106. It is understood, though, that a device other than termination device 108(2) could send a transmitted signal into communication infrastructure 110.

In a block 1006 of method 1000, the first termination device 108 sends a first loopback signal into communication infrastructure 110 in response to capturing the first transmitted signal in block 1004. The first loopback signal is a function of the first transmitted signal captured in block 1004. For example, the first loopback signal may have the same frequency and the same amplitude as the transmitted signal captured in block 1004. As another example, the first loopback signal may be different from, but a function of, the transmitted signal captured in block 1004, such as to encode information in the first loopback signal. For example, in some embodiments, amplitude of the first loopback signal is a function of one or more (i) amplitude of the transmitted signal captured in block 1004 and (ii) phase of the transmitted signal captured in block 1004, to encode the first loopback signal with information related to the amplitude and/or phase of the transmitted signal captured in block 1004. As such, the first termination device 108 effectively reflects the first transmitted signal back into communication infrastructure 110, although the reflection signal is not necessarily identical to the transmitted signal captured in block 1004. The first termination device 108 performs the reflection, for example, in a physical layer of the first termination device 108. In some other embodiments, the first termination device 108 performs the reflection at a higher level, such as by (i) converting the captured first transmitted signal from analog form to digital form, (ii) generating a digital loopback signal that is a function of the digitized captured first transmitted signal, such as using software and/or firmware, and (iii) converting the digital loopback signal to an analog loopback signal for sending into communication infrastructure 110. In certain embodiments, the first termination device 108 is capable of generating a loopback signal using more than one method, and in these embodiments, message 1102 may instruct the first termination device 108 which method to use when generating the loopback signal. Alternately, the first termination device 108 may generate multiple instances of the loopback signal using different respective methods.

In certain embodiments, the first termination device 108 sends the first loopback signal into communication infrastructure 110 essentially immediately after capturing the first transmitted signal in block 1004, while in some other embodiments, first termination device 108 sends the first loopback signal into communication infrastructure 110 after (i) capturing the first transmitted signal in block 1004 and (ii) expiration of a delay period. The delay period, for example, is a function of internal processing of the first termination device 108. In certain embodiments, the delay period is predetermined.

In one example of block 1006, termination device 108(1) sends a first loopback signal 1112 that is a function of captured transmitted signal 1106 into communication infrastructure 110, as illustrated in FIG. 11. First loopback signal 1112 encounters discontinuity 302, and a portion of first loopback signal 1112 is reflected back to termination device 108(1) as a first reflection signal 1114, as illustrated in FIG. 11. A remainder of first loopback signal 1112 continues to other elements of communication network 102 as first loopback signal 1116 after encountering discontinuity 302, as further illustrated in FIG. 11.

In a block 1008 of method 1000, the first termination device captures a first reflection signal from communication network infrastructure resulting from reflection of the first loopback signal by one or more features in the communication network infrastructure. In one example of block 1008, termination device 108(1) monitors 1118 communication infrastructure 110 for a predetermined amount of time after sending first loopback signal 1112 into communication infrastructure 110, and termination device 108(1) captures first reflection signal 1114 while monitoring 1118 communication infrastructure 110, as illustrated in FIG. 11.

Method 1000 optionally further includes blocks 1010 and 1012. In block 1010, the first termination device 108 sends a second loopback signal into communication infrastructure 110 in response to capturing the first reflection signal in block 1008. The second loopback signal is a function of the first reflection signal captured in block 1008. For example, the second loopback signal may have the same frequency and the same amplitude as the first reflection signal captured in block 1008, or amplitude of the second loopback signal may be a function of amplitude and/or of phase of the first reflection signal captured in block 1008. As such, the first termination device 108 effectively reflects the first reflection signal back into communication infrastructure 110, although the reflected signal is not necessarily identical to the first reflection signal captured in block 1008. In one example of block 1010, termination device 108(1) sends a second loopback signal 1120 that is a function of captured first reflection signal 1114 into communication infrastructure 110, as illustrated in FIG. 11. Second loopback signal 1120 encounters discontinuity 302, and a portion of second loopback signal 1120 is reflected back to termination device 108(1) as a second reflection signal 1122, as illustrated in FIG. 11. A remainder of second loopback signal 1120 continues to other elements of communication network 102 as second loopback signal 1124 after encountering discontinuity 302, as further illustrated in FIG. 11.

In a block 1012 of method 1000, the first termination device captures a second reflection signal from communication network infrastructure resulting from reflection of the second loopback signal by one or more features in the communication network infrastructure. In one example of block 1012, termination device 108(1) monitors 1126 communication infrastructure 110 for a predetermined amount of time after sending second loopback signal 1120 into communication infrastructure 110, and termination device 108(1) captures second reflection signal 1122 while monitoring 1126 communication infrastructure 110, as illustrated in FIG. 11. Method 1000 could be modified so that reflections resulting from loopback signals encountering a feature are captured by one or more termination devices 108 other than, or in addition to, the termination device sending loopback signals into communication infrastructure 110.

Signals captured in method 1000 can be used to determine respective distances from one or more termination devices 108 to the feature in communication infrastructure 110. For example, referring again to FIG. 11, termination device 108(2), controller 112, and/or one or more other elements of communication network 102 may determine a distance X between termination device 108(2) and discontinuity 302 by dividing (i) a difference between a time when termination device 108(2) captures reflection signal 1110 and a time when termination device 108(2) sends transmitted signal 1108 into communication infrastructure 110 by (ii) propagation velocity of signals in communication infrastructure 110.

As another example, termination device 108(1), controller 112, and/or one or more other elements of communication network 102 may determine a distance Y between termination device 108(1) and discontinuity 302 by dividing (i) a difference between a time when termination device 108(1) captures first reflection signal 1114 and a time when termination device 108(1) sends first loopback signal 1112 into communication infrastructure 110 by (ii) propagation velocity of signals in communication infrastructure 110. Furthermore, one or more termination devices 108, controller 112, and/or one or more other elements of communication network 102 may determine distance Y based on distance X and Z by subtracting distance X from distance Z. Similarly, one or more termination devices 108, controller 112, and/or one or more other elements of communication network 102 may determine distance X based on distance Y and Z by subtracting distance Y from distance Z. Distance Z may be known, or distance Z may be determined by communication network 102. For example, in some embodiments, communication network 102 determines distance Z by (i) sending a transmitted signal between termination devices 108(1) and 108(2), such as a pilot signal, a ranging signal, or a sounding signal, (ii) determining a travel time for the transmitted signal to travel between termination devices 108(1) and 108(2), and (iii) dividing the travel time by a propagation velocity of signals in communication infrastructure 110.

The signals captured in method 1000 can also be analyzed to determine one or more characteristics of the feature other than relative location of the feature. For example, referring again to FIG. 11, termination device 108(1), controller 112, and/or one or more other elements of communication network 102 may determine reflection strength of discontinuity 302 by comparing amplitude of first reflection signal 1114 to amplitude of first loopback signal 1112, where strength of discontinuity 302 is inversely proportional to the difference between the amplitude of first reflection signal 1114 and the amplitude of first loopback signal 1112. As another example, termination device 108(2), controller 112, and/or one or more other elements of communication network 102 may determine strength of discontinuity 302 by comparing amplitude of reflection signal 1110 to amplitude of transmitted signal 1108, where strength of discontinuity 302 is inversely proportional to the difference between the amplitude of reflection signal 1110 and the amplitude of transmitted signal 1108.

Method 1000 could be modified to omit blocks 1010 and 1012, and the first termination device 108 would therefore send only one loopback signal into communication infrastructure 110. Alternately, method 1000 could be modified to include one or more additional sets of blocks analogous to optional blocks 1010 and 1012 so that method 1000, and the first termination device 108 would therefore send three or more loopback signals into communication infrastructure 110, depending on the quantity of additional sets of blocks included in method 1000.

It should be noted that the effective reflection of signals received by the first termination device 108 in method 1000 results in an echo tunnel in communication infrastructure 110 between the first termination device 108 and the feature in communication infrastructure 110. This feature of method 1000 can be leveraged to enhance identification of an impairment or other feature in communication infrastructure 110. For example, consider again FIG. 11. Termination device 108(2), controller 112, and/or one or more other elements of communication network 102 may determine that discontinuity 302 is located in communication infrastructure 110 between termination device 108(1) and termination device 108(2) in response to (i) termination device 108(2) capturing reflection signal 1110 after sending transmitted signal 1108 and (ii) terminating device 108(1) capturing reflection signal 1114 after sending loopback signal 1112 into communication infrastructure 110. As another example, in certain embodiments, one or more termination devices 108, controller 112, and/or one or more other elements of communication network 102 are configured to determine distances X, Y, and Z of FIG. 11, such as using the procedures discussed above. In these embodiments, one or more termination devices 108, controller 112, and/or one or more other elements of communication network 102, are configured to determine that discontinuity 302 is located in communication infrastructure 110 between termination device 108(1) and termination device 108(2) in response to the sum of distance X and distance Y being equal to distance Z, or the sum of distance X and distance Y being within a predetermined percentage (e.g., +/−1 percent, +/−5 percent, +/−10 percent, etc.) of distance Z.

Some embodiments of the methods discussed above may be performed outside of a quiet period in the communication network. Accordingly, in certain embodiments, one or more termination devices 108 are configured to determine what portion of signals captured by the termination device 108 are from other termination devices 108, thereby enabling the termination device 108 to determine what portion of captured signals are from reflection of transmitted signals sent by the termination device 108. For example, in certain embodiments, one or more termination devices 108 are configured to send a first transmitted signal into communication infrastructure 110 at full power and subsequently send multiple transmitted signals into communication infrastructure 110 while reducing the transmit power of each subsequent transmitted signal until transmit power of the transmitted signals is zero. In these embodiments, the termination device 108 may (i) determine power of signals from other termination devices 108 based on power of signals captured by the termination device 108 after the power of the transmitted signals is zero and/or (ii) determine reflection strength of a feature in communication infrastructure 110 from a difference between power of a signal captured after sending the first transmitted signal into communication infrastructure 110 and power of a signal captured after power of the transmitted signals is zero.

Figure 12:
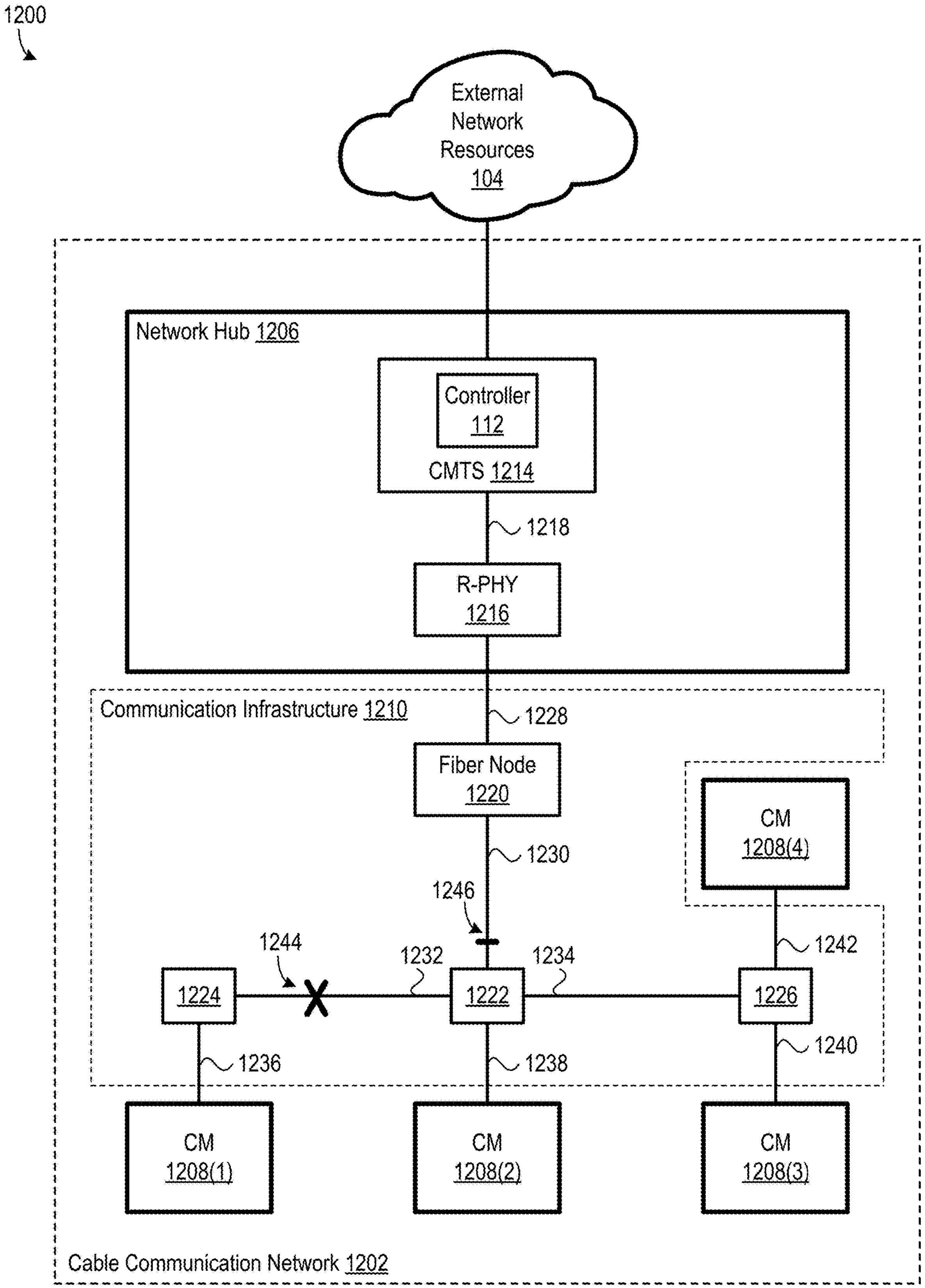
FIG. 12 is a schematic diagram of an embodiment of the FIG. 1 communication environment where the communication network is embodied by a cable communication network.

Referring again to FIG. 1, as discussed above, in some embodiments, communication network 102 is configured as a cable communication network. For example, FIG. 12 is a schematic diagram of a communication environment 1200, which is an embodiment of communication environment 100 where communication network 102 is embodied by a cable communication network 1202. Particular embodiments of cable communication network 1202 are configured to execute one or more of methods 200, 500, 700, 800, or 1000, discussed above, to identify a feature, such as an impairment in cable communication network 1202. Network hub 106 is embodied by a network hub 1206, communication infrastructure 110 is embodied by communication infrastructure 1210, and termination devices 108 are embodied by cable modems 1208, in cable communication network 1202. Network Hub 1206 includes a CMTS 1214, an R-PHY device 1216, and optical cable 1218. While FIG. 12 depicts controller 112 as being part of CMTS 1214, the configuration of controller 112 could vary in communication environment 1200 without departing from the scope hereof. For example, controller 112 could alternately be part of R-PHY device 1216 instead of being part of CMTS 1214, or controller 112 could be distributed between CMTS 1214 and R-PHY device 1216. As another example, controller 112 could be (i) separate from both of CMTS 1214 and R-PHY device 1216 within network hub 1206. As a further example, controller 112 could be external to network hub 1206. While not required, it is anticipated that network hub 1206 will frequently include additional R-PHY devices and associated communication infrastructure.

Optical cable 1218 communicatively couples CMTS 1214 and R-PHY device 1216. Although optical cable 1218 is depicted as having a short length, optical cable 1218 could have a long length, such as several kilometers, tens of kilometers, or more. As such, the elements of network hub 1206 could be distributed over a large physical area. CMTS 1214 interfaces network hub 1206 with external network resources 104. Additionally, CMTS 1214 and R-PHY device 1216 are collectively configured to control communication between cable modems 1208 and network hub 1206 via communication infrastructure 1210. CMTS 1214 is, for example, a hardware CMTS or a virtual CMTS implemented by one or more processors executing non-transitory instructions in the form of software and/or firmware stored in a data store. In some alternate embodiments, R-PHY device 1216 is omitted and the functions of R-PHY device 1216 are implemented by CMTS 1214. In some other alternate embodiments, R-PHY device 1216 is replaced with a R-MAC-PHY device or one or more other devices.

Communication infrastructure 1210 includes a fiber node 1220, a tap 1222, a tap 1224, a tap 1226, optical cable 1228, a hardline coaxial electrical cable 1230, a hardline coaxial electrical cable 1232, a hardline coaxial electrical cable 1234, a drop cable 1236, a drop cable 1238, a drop cable 1240, and a drop cable 1242. Optical cable 1228 communicatively couples fiber node 1220 to R-PHY device 1216, and hardline coaxial electrical cable 1230 communicatively couples tap 1222 to fiber node 1220. Hardline coaxial electrical cable 1232 communicatively couples tap 1224 to tap 1222, and hardline coaxial electrical cable 1234 communicatively couples tap 1226 to tap 1222. Drop cable 1236 communicatively couples cable modem 1208(1) to tap 1224, and drop cable 1238 communicatively couples cable modem 1208(2) to tap 1222. Drop cable 1240 communicatively couples cable modem 1208(3) to tap 1226, and drop cable 1242 communicatively couples cable modem 1208(4) to tap 1226.

Fiber node 1220 translates communication signals in the optical domain on optical cable 1228 to communication signals in the electrical domain on hardline coaxial electrical cable 1230 and vice versa. In some alternate embodiments, fiber node 1220 and optical cable 1228 are omitted, and hardline coaxial electrical cable 1230 communicatively couples tap 1222 to R-PHY device 1216. Additionally, communication infrastructure 1210 could include additional elements, such as amplifiers and/or power inserters. FIG. 12 depicts impairments 1244 and 1246 which are examples of impairments 302 and 304 of FIG. 3, respectively. Impairment 1244 is, for example, a discontinuity in hardline coaxial electrical cable 1232, such as resulting from water intrusion into the cable. Impairment 1246 is, for example, an opening in hardline coaxial electrical cable 1230 allowing undesired ingress of radio frequency signals into communication infrastructure 1210.

In particular embodiments, cable modems 1208 are FDX cable modems or frequency division duplex (FDD) cable modems. Each cable modem 1208 need not have the same configuration. For example, cable modem 1208(1) could be an FDD cable modem, and cable modem 1208(2) could be a FDX cable modem. In some embodiments, cable communication network 1202 is configured to operate according to a DOCSIS 3.1 communication standard, a DOCSIS 4.0 communication standard, and/or one or more successor cable communication standards. In certain embodiments, one or more cable modems are configured to use one or more of full band capture, upstream data analysis (UDA,) a symbol capture procedure, a pre-equalization procedure, and/or a channel estimation procedure, to capture signals to identify a feature, such as when cable communication network 1202 executes one of methods 200, 500, 700, 800, or 1000.

The performance of one or more of methods 200, 500, 700, 800, or 1000 by cable communication network 1202 may advantageously help identify potential interference between cable modems 1208, especially in embodiments where some cable modems 1208 operate according to a high performance communication standard (e.g., DOCSIS 4.0) while other cable modems 1208 operate according to a lower performance communication standard (e.g., DOCSIS 3.1, DOCSIS 3.0, or DOCSIS 2.0). In particular, a cable modem 1208 operating at a high performance communication standard may generate communication signals having a higher energy level than communication signals generated by a cable modem 1208 operating at a lower performance communication standard. Consequently, the cable modem 1208 operating at the high performance communication standard may cause interference with the cable modem 1208 operating at the lower performance communication standard. Methods 200, 500, 700, 800, or 1000 can be used to identify this interference by (i) causing a cable modem 1208 to send transmitted signals into communication infrastructure 1210 having characteristics of signals generated by a cable modem 1208 operating at a high performance communication standard and (ii) monitoring operation of other cable modems 1208 to determine whether the cable modems 1208 experience performance degradation, such as increased forward error correction or decreased up-time duration, due to sending the transmitted signals into communication infrastructure 1210.

For example, assume that cable modems 1208(1) and 1208(2) currently operate according to a DOCSIS 3.0 communication standard and it is proposed to upgrade cable modem 1208(2) to a DOCSIS 4.0 communication standard. Potential for interference between cable modems 1208(2) and 1208(1) if cable modem 1208(2) operates according to the DOCSIS 4.0 communication standard may be determined, for example, by executing method 200 in cable communication network 1202 where (i) cable modem 1208(2) is selected to perform feature search in block 202 and (ii) cable modem 1208(2) sends transmitted signals into communication infrastructure 1210 in block 208 where the transmitted signals have characteristics of DOCSIS 4.0 communication signals. Operation of cable modem 1208(1) can be simultaneously monitored for impaired operation resulting from cable modem 1208(2) sending the transmitted signals into communication infrastructure 1210.

In some embodiments, one or more cable modems 1208 are further configured to estimate distance between the cable modem 1208 and a network feature, e.g., impairment 1244, using phase information, such as phase information derived from one or more of a channel estimation process, a pre-equalization process, and a symbol capture process. For example, a cable modem 1208 may use one or more of a channel estimation process, a pre-equalization process, and a symbol capture process to determine a complex channel response of the cable modem 1208 in a frequency domain. The cable modem 1208 may then transform the channel response from the frequency domain to a time domain, such as using a Fourier transform process. The resulting channel response in the time domain indicates signals that are out of phase, or delayed in time, due to a reflection, e.g., such as from an impairment or other network feature. In these embodiments, the cable modem 1208 divides the time delay by a signal propagation velocity in cable communication network 1202, e.g., by signal propagation velocity along a coaxial electrical cable, to estimate a distance between the cable modem 1208 and the network feature causing signal reflection.

Figure 13:
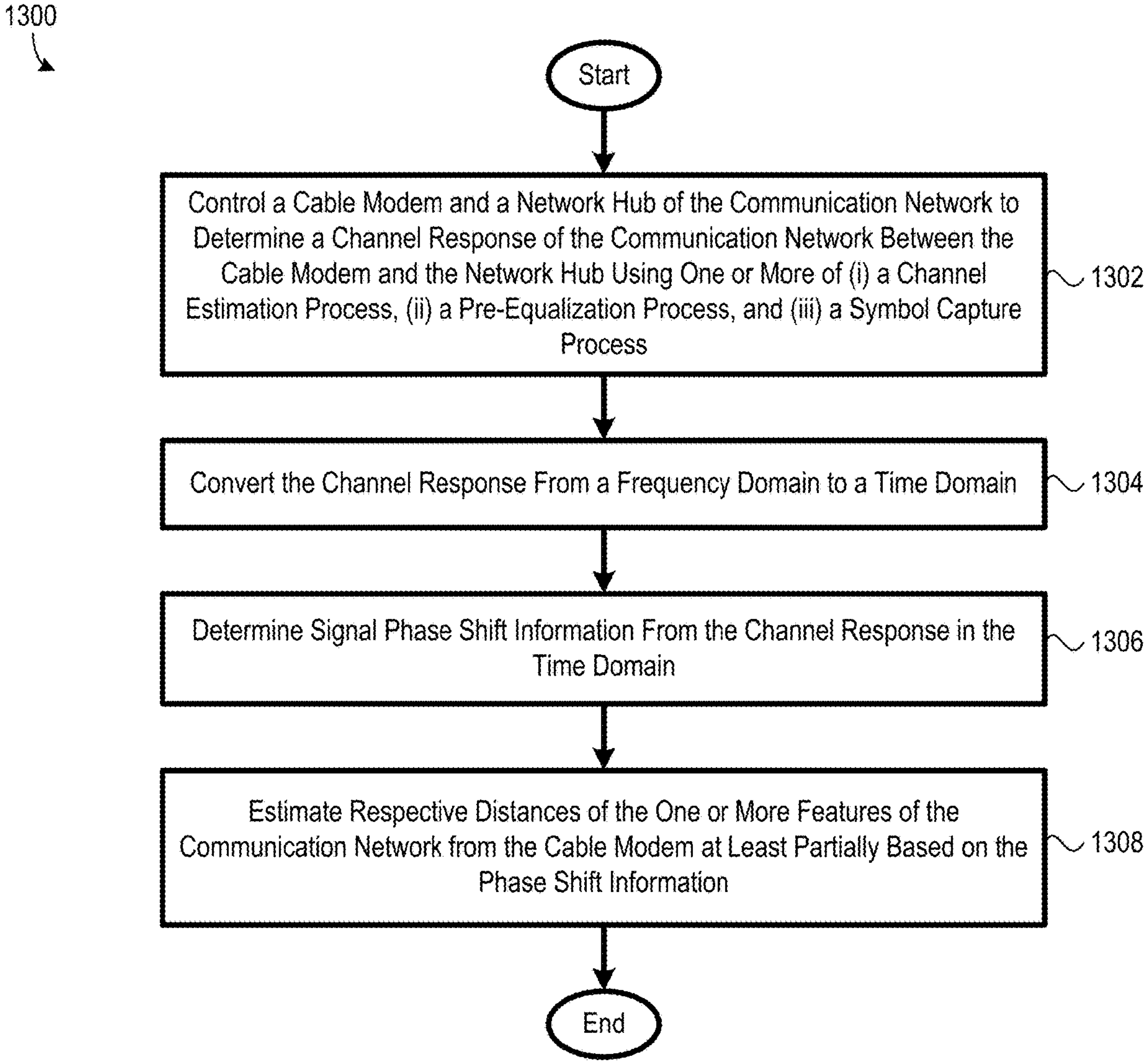
FIG. 13 is a flow chart of a method for determining respective locations of one or more features of a communication network relative to a cable modem of the communication network, according to an embodiment.

For example, FIG. 13 is a flow chart of a method for determining respective locations of one or more features of a communication network relative to a cable modem of the communication network, which is one example of how certain embodiments of cable modems 1208 may determine relative location of a network feature using phase information. In a block 1302 of method 1300, controller 112 controls a cable modem 1208 and network hub 1206 of cable communication network 1202 to determine a channel response of cable communication network 1202 between the cable modem 1208 and network hub 1206 using one or more of (i) a channel estimation process, (ii) a pre-equalization process, and (iii) a symbol capture process. As known in the art, a channel estimation process includes a cable modem receiving a signal and performing a complex equalization process to recover information from the signal. The cable modem can subsequently recover a channel response from the signal. A pre-equalization process, on the other hand, includes a cable modem sending a signal to a CMTS and the cable modem adjusting its frequency response in accordance with instructions from the CMTS, thereby pre-equalizing uplink signals from the cable modem to account for cable plant issues. The cable modem may subsequently determine a channel response from the pre-equalization parameters. A symbol capture process, in turn, includes a cable modem capturing a predetermined symbol sent by a CMTS, and the cable modem can determine a channel response from the captured symbol, e.g., as a function of distortion of the captured symbol. In one example of block 1302, controller 112 controls CMTS 1214 and cable modem 1208(1) to determine a channel response between cable modem 1208(1) and network hub 1206 using one or more of (i) a channel estimation process, (ii) a pre-equalization process, and (iii) a symbol capture process.

In a block 1304 of method 1300, the channel response determined in block 1302 is converted from a frequency domain to a time domain. In one example of block 1304, cable modem 1208(1) and/or controller 112 convert the channel response between cable modem 1208(1) and network hub 1206 from a frequency domain to a time domain using a Fourier transform process. In a block 1306 of method 1300, the phase shift information is determined from the channel response in the time domain from block 1304. In one example of block 1306, cable modem 1208(1) and/or controller 112 determine phase shift information from the channel response between cable modem 1208(1) and network hub 1206 in the time domain. In a block 1308 of method 1300, respective distances of the one or more features of the communication network from the cable modem 1208 are estimated at least partially based on the signal phase shift information. In one example of block 1308, cable modem 1208(1) and/or controller 112 (*i*) determine time delay resulting from impairment 1244 from the phase shift information determined in block 1306 and (ii) estimate the distance of impairment 1244 by dividing the time delay by signal propagation velocity along a coaxial electrical cable.

Figure 14:
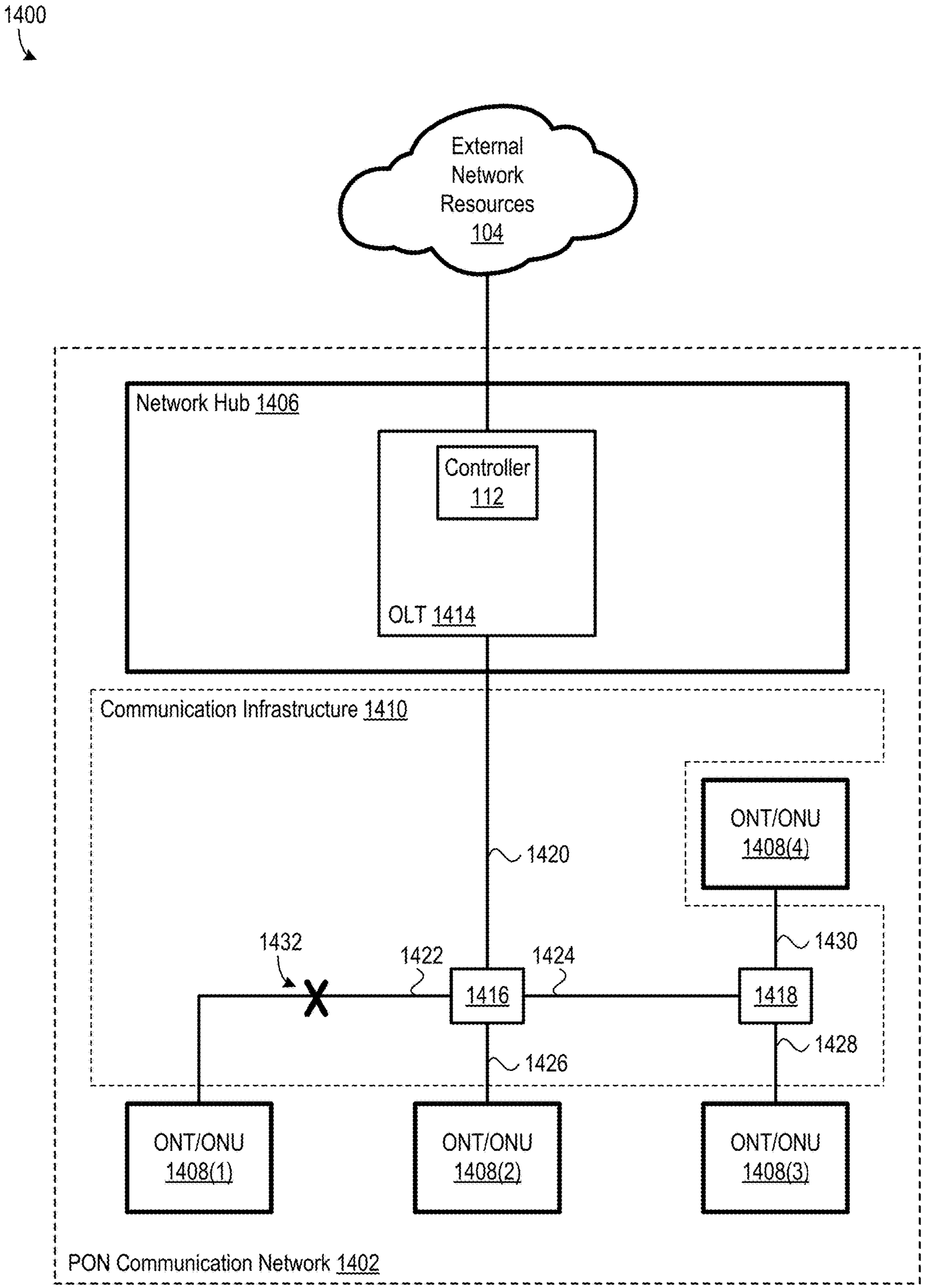
FIG. 14 is a schematic diagram of an embodiment of the FIG. 1 communication environment where the communication network is embodied by a passive optical network (PON) communication network.

Referring again to FIG. 1, as discussed above, in some embodiments, communication network 102 is configured as a PON communication network. For example, FIG. 14 is schematic diagram of a communication environment 1400, which is an embodiment of communication environment 100 where communication network 102 is embodied by a PON communication network 1402. Particular embodiments of PON communication network 1402 are configured to execute one or more of methods 200, 500, 700, 800, or 1000, discussed above, to identify a feature, such as an impairment, in PON communication network 1402. Network hub 106 is embodied by a network hub 1406, communication infrastructure 110 is embodied by communication infrastructure 1410, and termination devices 108 are embodied by ONTs/ONUs 1408, in PON communication network 1402. Network hub 1406 includes an OLT 1414. While FIG. 14 depicts controller 112 as being part of OLT 1414, the configuration of controller 112 could vary in communication environment 1400 without departing from the scope hereof. For example, controller 112 could alternately be separate from OLT 1414 within network hub 1406. As another example, controller 112 could be external to network hub 1406. OLT 1414 interfaces network hub 1406 with external network resources 104, and OLT 1414 also controls communication between ONTs/ONUs 1408 and network hub 1406 via communication infrastructure 1410.

Communication infrastructure 1410 includes a splitter 1416, a splitter 1418, optical cable 1420, optical cable 1422, optical cable 1424, optical cable 1426, optical cable 1428, and optical cable 1430. Optical cable 1420 communicatively couples splitter 1416 to OLT 1414, and optical cable 1424 communicatively couples splitter 1418 to splitter 1416. Optical cable 1422 communicatively couples ONT/ONU 1408(1) to splitter 1416, and optical cable 1426 communicatively couples ONT/ONU 1408(2) to splitter 1416. Optical cable 1428 communicatively couples ONT/ONU 1408(3) to splitter 1418, and optical cable 1430 communicatively couples ONT/ONU 1408(4) to splitter 1418.

Each ONT/ONU 1408 may be either an ONT or an ONU. In some embodiments, PON communication network 1402 operates according to one or more of an Ethernet passive optical network (EPON) protocol, a radio frequency of over glass (RFOG or RFoG) protocol, a Gigabit-capable passive optical network (GPON) protocol, an XG-PON protocol, an XGS-PON protocol, and successors of any of foregoing protocols. FIG. 14 depicts an impairment 1432 which is an example of impairment 302 of FIG. 3. Impairment 1432 is, for example, a crack in optical cable 1422 causing a change in index of refraction of optical cable 1422 at the location of impairment 1432.

Figure 15:
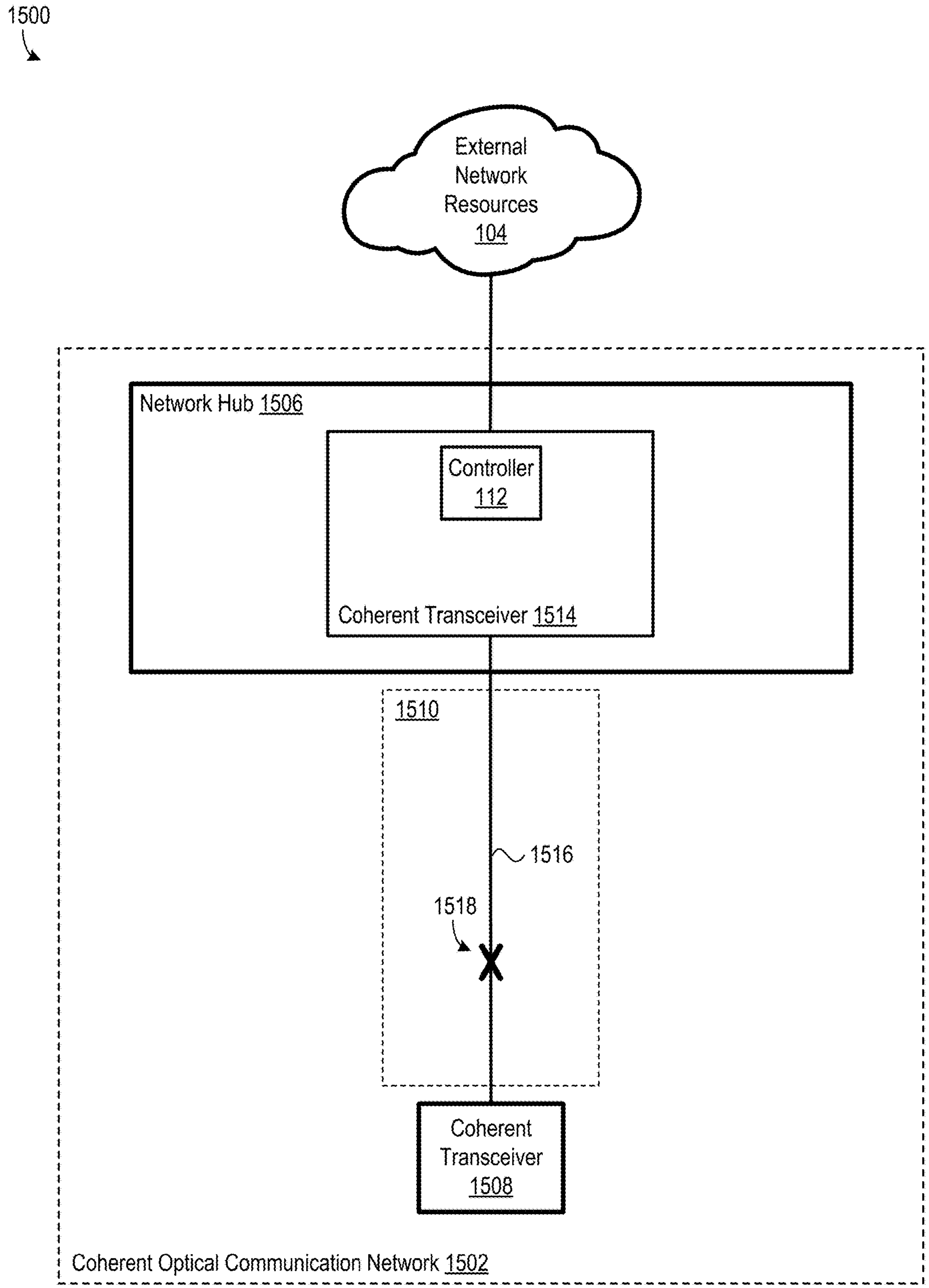
FIG. 15 is a schematic diagram of an embodiment of the FIG. 1 communication environment where the communication network is embodied by a coherent optical communication network.

Referring again to FIG. 1, as discussed above, in some embodiments, communication network 102 is configured as a coherent optical communication network. For example, FIG. 15 is schematic diagram of a communication environment 1500, which is an embodiment of communication environment 100 where communication network 102 is embodied by a coherent optical communication network 1502. Particular embodiments of coherent optical communication network 1502 are configured to execute one or more of methods 200, 500, 700, 800, or 1000, discussed above, to identify a feature, such as an impairment, in coherent optical communication network 1502. Network hub 106 is embodied by a network hub 1506, communication infrastructure 110 is embodied by communication infrastructure 1510, and termination devices 108 are embodied by a coherent transceiver 1508, in coherent optical communication network 1502. In contrast to cable communication network 1202 of FIG. 12 and PON communication network 1402 of FIG. 14, coherent optical communication network 1502 is a transmission communication network instead of an access communication network. Accordingly, coherent optical communication network 1502 includes only a single termination device, i.e., coherent transceiver 1508. Coherent optical communication network 1502 is used, for example, to transmit communication signals over long distances or to transmit communication signals over short distances in data centers, such as in hyperscaler data centers.

Network hub 1506 includes a coherent transceiver 1514, and communication infrastructure 1510 includes an optical cable 1516 communicatively coupling coherent transceiver 1514 and coherent transceiver 1508. While FIG. 15 depicts controller 112 as being part of coherent transceiver 1514, the configuration of controller 112 could vary in communication environment 1500 without departing from the scope hereof. For example, controller 112 could alternately be separate from coherent transceiver 1514 within network hub 1506. As another example, controller 112 could be external to network hub 1506. Coherent transceiver 1514 interfaces network hub 1506 with external network resources 104. Additionally, coherent transceiver 1514 is configured to modulate optical signals for transmission to coherent transceiver 1508 via optical cable 1516 by modulating each of amplitude, phase, and polarization of the optical signals. Furthermore, coherent transceiver 1514 is configured to demodulate coherent optical signals received from coherent transceiver 1508 via optical cable 1516. Coherent transceiver 1508 is configured to modulate optical signals for transmission to coherent transceiver 1514 via optical cable 1516 by modulating each of amplitude, phase, and polarization of the optical signals. Additionally, coherent transceiver 1508 is configured to demodulate coherent optical signals received from coherent transceiver 1514 via optical cable 1516. While coherent optical communication network 1502 is configured to support two-way communication, coherent optical communication network 1502 could be modified to support only one-way communication.

FIG. 15 illustrates an impairment 1518, which is one example of an impairment that may be identified by coherent optical communication network 1502 executing one or more of methods 200, 500, 700, 800, or 1000. Impairment 1518 is, for example, a crack in optical cable 1516 causing a change in index of refraction of optical cable 1516 at the location of impairment 1518.

Figure 16:
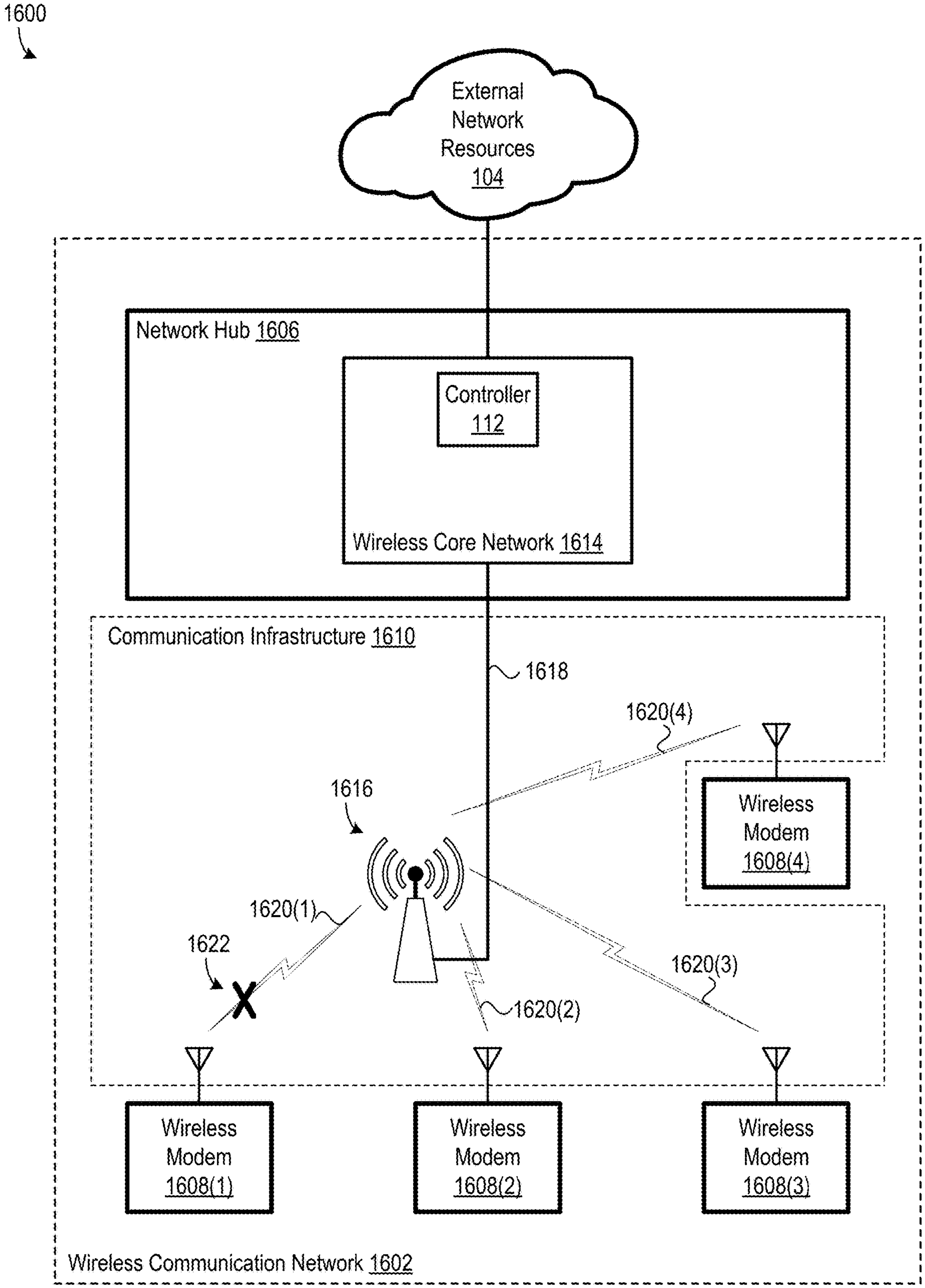
FIG. 16 is a schematic diagram of an embodiment of the FIG. 1 communication environment where the communication network is embodied by a wireless communication network.

Referring again to FIG. 1, as discussed above, in some embodiments, communication network 102 is configured as a wireless communication network. For example, FIG. 16 is a schematic diagram of a communication environment 1600, which is an embodiment of communication environment 100 where communication network 102 is embodied by a wireless communication network 1602. Particular embodiments of wireless communication network 1602 are configured to execute one or more of methods 200, 500, 700, 800, or 1000, discussed above, to identify a feature, such as an impairment, in wireless communication network 1602. Network hub 106 is embodied by a network hub 1606, communication infrastructure 110 is embodied by communication infrastructure 1610, and termination devices 108 are embodied by wireless modems 1608, in wireless communication network 1602. Network hub 1606 includes a wireless core network 1614. While FIG. 16 depicts controller 112 as being part of wireless core network 1614, the configuration of controller 112 could vary in communication environment 1600 without departing from the scope hereof. For example, controller 112 could alternately be separate from wireless core network 1614 within network hub 1606. As another example, controller 112 could be external to network hub 1606. Wireless core network 1614 interfaces network hub 1606 with external network resources 104, and wireless core network 1614 also controls communication between wireless modems 1608 and network hub 1606 via communication infrastructure 1610.

Communication infrastructure 1610 includes a wireless access point 1616 and a communication link 1618 communicatively coupling wireless access point 1616 to wireless core network 1614. Communication infrastructure 1610 may also be considered to include free space (not labeled) for transmission of wireless communication signals. Communication link 1618 may include multiple communication mediums and/or communication hardware. Each wireless modem 1608 is configured to wirelessly communicate with wireless access point 1616 via respective wireless communication signals 1620.

In some embodiments, wireless communication network 1602 is configured as a cellular wireless communication network, e.g., operating according to a Third Generation Partnership Project (3GPP) standard, such as a Long Term Evolution (LTE) standard, a Fifth Generation (5G) standard, a Sixth Generation (6G) standard, and/or successors thereof. In embodiments where wireless communication network 1602 is a cellular wireless communication network, wireless core network 1614 includes, for example, an evolved packet core, a 5G core network, and/or a 6G core network. Additionally, in some embodiments where wireless communication network 1602 is a cellular wireless communication network, wireless access point 1616 is part of a radio access network (RAN). In some other embodiments, wireless communication network 1602 operates according to an Institute of Electrical and Electronics Engineers (IEEE) standard, such as a Wi-Fi standard or a HaLow standard. Additionally, in certain other embodiments, wireless communication network 1602 is a Bluetooth wireless communication network, a satellite wireless communication network (e.g., using very low earth orbit (VLEO) satellites, low earth orbit (LEO) satellites, medium earth orbit (MEO) satellites, or geostationary equatorial orbit (GEO) satellites), a LoRa wireless communication network, a Zigbee wireless communication network, or a Z-wave wireless communication network. However, wireless communication network 1602 could be another type of wireless communication network without departing from the scope hereof.

FIG. 16 illustrates an impairment 1622, which is one example of an impairment that may be identified by wireless communication network 1602 executing one or more of one or more of methods 200, 500, 700, 800, or 1000. Impairment 1622 is, for example, fading of wireless communication signals 1620(1) caused by a temporary or permanent obstacle (not shown) between wireless modem 1608(1) and wireless access point 1616.

Combinations of Features

Features described above may be combined in various ways without departing from the scope hereof. The following examples illustrate some possible combinations.

(A1) A method for identifying a feature in a communication network includes (1) receiving, at a first termination device of the communication network, a message specifying an assignment of first network resources of the communication network to the first termination device, (2) sending, from the first termination device, one or more transmitted signals into infrastructure of the communication network at one or more times specified by the assignment of the first network resources, the one or more transmitted signals being within one or more frequency ranges specified by the assignment of the first network resources, and (3) capturing, at the first termination device, one or more reflection signals from the infrastructure of the communication network resulting from reflection of the one or more transmitted signals by one or more features in the infrastructure of the communication network.

(A2) In the method denoted as (A1), the one or more transmitted signals may include one or more pilot signals.

(A3) In either one of the methods denoted as (A1) and (A2), the one or more transmitted signals may include at least one of (i) a ranging signal and (ii) a sounding signal.

(A4) In any one of the methods denoted as (A1) through (A3), the one or more times specified by the assignment of the first network resources may correspond to one or more quiet periods of the communication network.

(A5) In any one of the methods denoted as (A1) through (A4), (1) the first termination device may be a cable modem, and (2) the step of capturing the one or more reflection signals from the infrastructure of the communication network may include using upstream data analysis (UDA) of the cable modem to capture the one or more reflection signals.

(A6) In any one of the methods denoted as (A1) through (A4), (1) the first termination device may be a cable modem, and (2) the step of capturing the one or more reflection signals from the infrastructure of the communication network may include using a symbol capture procedure at the cable modem.

(A7) In any one of the methods denoted as (A1) through (A6), the first network resources may include one or more time periods and one or more frequency ranges.

(A8) Any one of the methods denoted as (A1) through (A7) may further include determining one or more characteristics of the one or more features in the infrastructure of the communication network at least partially based on the one or more reflection signals captured by the first termination device.

(A9) Any one of the methods denoted as (A1) through (A8) may further include determining respective locations of the one or more features in the infrastructure of the communication network relative to the first termination device at least partially based on one or more differences in time between (i) respective times that the one or more reflection signals are captured by the first termination device and (ii) respective times that the one or more transmitted signals are sent into the infrastructure of the communication network from the first termination device.

(A10) Any one of the methods denoted as (A1) through (A9) may further include determining respective reflection strengths of the one or more features in the infrastructure of the communication network at least partially based on the one or more reflection signals captured by the first termination device from the infrastructure of the communication network.

(A11) In any one of the methods denoted as (A1) through (A10), the one or more features of the communication network may include one or more discontinuities in one or more communication cables of the communication network.

(A12) Any one of the methods denoted as (A1) through (A11) may further include determining presence of a non-linear feature in response to the one or more reflection signals captured by the first termination device from the infrastructure of the communication network being within a frequency range that is different from a frequency range of the one or more transmitted signals.

(A13) Any one of the methods denoted as (A1) through (A12) may further include determining presence of signal ingress in response to one or more additional signals captured by the first termination device from the infrastructure of the communication network being within a frequency range that is different from a frequency range of the one or more transmitted signals.

(A14) Any one of the methods denoted as (A1) through (A13) may further include, at the first termination device, sending a request for the first network resources to a network hub.

(A15) In the method denoted as (A14) the network hub may include one or more of a cable modem termination system (CMTS), a remote physical layer (R-PHY) device, an optical line terminal (OLT), an ONT, an ONU, a BNG, and a core wireless communication network.

(A16) Any one of the methods denoted as (A1) through (A14) may further include receiving the message specifying the assignment of the first network resources of the communication network to the first termination device from a network hub.

(A17) In the method denoted as (A16), the network hub may include one or more of a cable modem termination system (CMTS), a remote physical layer (R-PHY) device, an optical line terminal (OLT), an ONT, an ONU, a BNG, and a core wireless communication network.

(A18) In any one of the methods denoted as (A1) through (A14), (1) the communication network may be a cable communication network, and (2) the first termination device may be a cable modem connected to a coaxial electrical cable of the communication network.

(A19) In any one of the methods denoted as (A1) through (A14), (1) the communication network may be an optical communication network, and (2) the first termination device may be one of an optical network termination (ONT) and an optical network unit (ONU) connected to an optical cable of the communication network.

(A20) In any one of the methods denoted as (A1) through (A14), the communication network may be a coherent optical communication network.

(A21) In any one of the methods denoted as (A1) through (A14), (1) the communication network may be a wireless communication network, and (2) the first termination device may be a wireless modem.

(A22) In any one of the methods denoted as (A1) through (A21), the first termination device may be capable of receiving communication signals having respective frequencies of the one or more transmitted signals.

(B1) A method for identifying a feature in a communication network includes (1) receiving, at a first termination device of the communication network, a message instructing the first termination device to monitor infrastructure of the communication network for presence of signals within a specified time period and within a specified frequency range, (2) capturing, at the first termination device, a transmitted signal during the specified time period, (3) sending, from the first termination device, a loopback signal into the infrastructure of the communication network, the loopback signal being a function of the transmitted signal captured by the first termination device, and (4) capturing, at the first termination device, one or more first reflection signals from the infrastructure of the communication network resulting from reflection of the loopback signal by one or more features of the infrastructure of the communication network.

(B2) The method denoted as (B1) may further include sending, from a second termination device of the communication network, the transmitted signal into the infrastructure of the communication network.

(B3) In the method denoted as (B2), the transmitted signal may include at least one of (i) a pilot signal, (ii) a ranging signal, (iii) a sounding signal, and (iv) a communication traffic bearing signal.

(B4) Any one of the methods denoted as (B1) through (B3) may further include determining respective locations of the one or more features in the infrastructure of the communication network relative to the first termination device at least partially based on one or more differences in time between (i) respective times that the one or more first reflection signals are captured by the first termination device and (ii) respective times that the loopback signal is sent into the infrastructure of the communication network from the first termination device.

(B5) Any one of the methods denoted as (B1) through (B4) may further include determining respective locations of the one or more features in the infrastructure of the communication network relative to a second termination device of the communication network at least partially based on differences between (i) distance between the second termination device and the first termination device and (ii) respective distances of the one or more features in the infrastructure of the communication network from the first termination device.

(B6) Any one of the methods denoted as (B1) through (B5) may further include determining one or more characteristics of the one or more features in the infrastructure of the communication network at least partially based on the one or more first reflection signals captured by the first termination device from the infrastructure of the communication network.

(B7) In any one of the methods denoted as (B1) through (B6), (1) the communication network may be a cable communication network and (2) the first termination device may be a cable modem connected to a coaxial electrical cable of the communication network.

(B8) In any one of the methods denoted as (B1) through (B6), (1) the communication network may be an optical communication network and (2) the first termination device may be one of an optical network termination (ONT) and an optical network unit (ONU) connected to an optical cable of the communication network.

(B9) In any one of the methods denoted as (B1) through (B6), the communication network may be a coherent optical communication network.

(B10) In any one of the methods denoted as (B1) through (B6), (1) the communication network may be a wireless communication network and (2) the first termination device may be a wireless modem.

(C1) A method for identifying a feature in a communication network includes (1) receiving, at a first termination device of the communication network, a message instructing the first termination device to monitor infrastructure of the communication network for presence of signals within a specified time period and within a specified frequency range, (2) receiving, at a second termination device of the communication network, a message instructing the second termination device to monitor the infrastructure of the communication network for presence of signals within the specified time period and within the specified frequency range, (3) capturing, at the first termination device, one or more first reflection signals from the infrastructure of the communication network resulting from reflection of one or more transmitted signals by one or more first features in the infrastructure of the communication network, the one or more transmitted signals being within the specified frequency range, and (4) capturing, at the second termination device, one or more second reflection signals from the infrastructure of the communication network resulting from reflection of the one or more transmitted signals by the one or more first features in the infrastructure of the communication network.

(C2) The method denoted as (C1) may further include sending the one or more transmitted signals into the infrastructure of the communication network at one or more times that are no later than the specified time period.

(C3) In the method denoted as (C2), the one or more transmitted signals may include at least one of (i) a pilot signal, (ii) a ranging signal, (iii) a sounding signal, and (iv) communication traffic bearing signals.

(C4) Any one of the methods denoted as (C1) through (C3) may further include determining one or more characteristics of the one or more first features in the infrastructure of the communication network at least partially based one or more of (i) the one or more first reflection signals captured by the first termination device from the infrastructure of the communication network and (ii) the one or more second reflection signals captured by the second termination device from the infrastructure of the communication network.

(C5) Any one of the methods denoted as (C1) through (C4) may further include (1) sending the one or more transmitted signals into the infrastructure of the communication network from the first termination device and (2) determining respective locations of the one or more first features in the infrastructure of the communication network relative to the first termination device at least partially based on one or more differences in time between (i) respective times that the one or more first reflection signals are captured by the first termination device and (ii) respective times that the one or more transmitted signals are sent into the communication network from the first termination device.

(C6) Any one of the methods denoted as (C1) through (C5) may further include comparing (i) the one or more first reflection signals captured by the first termination device from the infrastructure of the communication network and (ii) the one or more second reflection signals captured by the second termination device from the infrastructure of the communication network, to determine that the one or more first features in the infrastructure of the communication network are within a communication path of the communication network that is shared by each of the first termination device and the second termination device.

(C7) Any one of the methods denoted as (C1) through (C6) may further include using a ranging and sounding process to determine that the second termination device is within a communication range of the first termination device.

(C8) In any one of the methods denoted as (C1) through (C7), (1) the communication network may be a cable communication network and (2) the first termination device may be a cable modem connected to a coaxial electrical cable of the communication network.

(C9) In any one of the methods denoted as (C1) through (C7), (1) the communication network may be an optical communication network and (2) the first termination device may be one of an optical network termination (ONT) and an optical network unit (ONU) connected to an optical cable of the communication network.

(C10) In any one of the methods denoted as (C1) through (C7), the communication network may be a coherent optical communication network.

(C11) In any one of the methods denoted as (C1) through (C7), (1) the communication network may be a wireless communication network and (2) the first termination device may be a wireless modem.

(D1) A method for determining respective locations of one or more features of a communication network relative to a cable modem of the communication network includes (1) controlling the cable modem and a network hub of the communication network to determine a channel response of the communication network between the cable modem and the network hub using one or more of (i) a channel estimation process, (ii) a pre-equalization process, and (iii) a symbol capture process, (2) converting the channel response from a frequency domain to a time domain, (3) determining signal phase information from the channel response in the time domain, and (4) estimating respective distances of the one or more features of the communication network from the cable modem at least partially based on the signal phase information.

(D2) In the method denoted as (D1), the network hub may include a cable modem termination system.

(D3) In any one of the methods denoted as (D1) and (D2), the network hub may include a remote physical layer (R-PHY) device.

(D4) In any one of the methods denoted as (D1) through (D3), the one or more features of the communication network may include one or more impairments in infrastructure of the communication network.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for identifying a feature in a communication network, the method comprising:

receiving, at a first termination device of the communication network, a message specifying an assignment of first network resources of the communication network to the first termination device;

sending, from the first termination device, one or more transmitted signals into infrastructure of the communication network at one or more times specified by the assignment of the first network resources, the one or more transmitted signals being within one or more frequency ranges specified by the assignment of the first network resources; and capturing, at the first termination device, one or more reflection signals from the infrastructure of the communication network resulting from reflection of the one or more transmitted signals by one or more features in the infrastructure of the communication network.

2. The method of claim 1, wherein the one or more transmitted signals comprises one or more pilot signals.

3. The method of claim 1, wherein the one or more transmitted signals comprise at least one of (i) a ranging signal and (ii) a sounding signal.

4. The method of claim 1, wherein the one or more times specified by the assignment of the first network resources correspond to one or more quiet periods of the communication network.

5. The method of claim 1, wherein the first network resources comprise one or more time periods and one or more frequency ranges.

6. The method of claim 1, further comprising determining one or more characteristics of the one or more features in the infrastructure of the communication network at least partially based on the one or more reflection signals captured by the first termination device.

7. The method of claim 1, further comprising determining respective locations of the one or more features in the infrastructure of the communication network relative to the first termination device at least partially based on one or more differences in time between (i) respective times that the one or more reflection signals are captured by the first termination device and (ii) respective times that the one or more transmitted signals are sent into the infrastructure of the communication network from the first termination device.

8. The method of claim 1, further comprising determining respective reflection strengths of the one or more features in the infrastructure of the communication network at least partially based on the one or more reflection signals captured by the first termination device from the infrastructure of the communication network.

9. The method of claim 1, further comprising determining presence of a non-linear feature in response to the one or more reflection signals captured by the first termination device from the infrastructure of the communication network being within a frequency range that is different from a frequency range of the one or more transmitted signals.

10. The method of claim 1, further comprising determining presence of signal ingress in response to one or more additional signals captured by the first termination device from the infrastructure of the communication network being within a frequency range that is different from a frequency range of the one or more transmitted signals.

11. The method of claim 1, wherein the first termination device is capable of receiving communication signals having respective frequencies of the one or more transmitted signals.

12. The method of claim 1, wherein:

the communication network is a cable communication network; and the first termination device is a cable modem connected to a coaxial electrical cable of the communication network.

13. A method for identifying a feature in a communication network, the method comprising:

receiving, at a first termination device of the communication network, a message instructing the first termination device to monitor infrastructure of the communication network for presence of signals within a specified time period and within a specified frequency range;

capturing, at the first termination device, a transmitted signal during the specified time period;

sending, from the first termination device, a loopback signal into the infrastructure of the communication network, the loopback signal being a function of the transmitted signal captured by the first termination device; and capturing, at the first termination device, one or more first reflection signals from the infrastructure of the communication network resulting from reflection of the loopback signal by one or more features of the infrastructure of the communication network.

14. The method of claim 13, further comprising sending, from a second termination device of the communication network, the transmitted signal into the infrastructure of the communication network.

15. The method of claim 13, further comprising determining respective locations of the one or more features in the infrastructure of the communication network relative to the first termination device at least partially based on one or more differences in time between (i) respective times that the one or more first reflection signals are captured by the first termination device and (ii) respective times that the loopback signal is sent into the infrastructure of the communication network from the first termination device.

16. The method of claim 13, further comprising determining respective locations of the one or more features in the infrastructure of the communication network relative to a second termination device of the communication network at least partially based on differences between (i) distance between the second termination device and the first termination device and (ii) respective distances of the one or more features in the infrastructure of the communication network from the first termination device.

17. The method of claim 13, wherein:

the communication network is a cable communication network; and the first termination device is a cable modem connected to a coaxial electrical cable of the communication network.

18. A method for identifying a feature in a communication network, the method comprising:

receiving, at a first termination device of the communication network, a message instructing the first termination device to monitor infrastructure of the communication network for presence of signals within a specified time period and within a specified frequency range;

receiving, at a second termination device of the communication network, a message instructing the second termination device to monitor the infrastructure of the communication network for presence of signals within the specified time period and within the specified frequency range;

capturing, at the first termination device, one or more first reflection signals from the infrastructure of the communication network resulting from reflection of one or more transmitted signals by one or more first features in the infrastructure of the communication network, the one or more transmitted signals being within the specified frequency range; and capturing, at the second termination device, one or more second reflection signals from the infrastructure of the communication network resulting from reflection of the one or more transmitted signals by the one or more first features in the infrastructure of the communication network.

19. The method of claim 18, further comprising:

sending the one or more transmitted signals into the infrastructure of the communication network from the first termination device; and determining respective locations of the one or more first features in the infrastructure of the communication network relative to the first termination device at least partially based on one or more differences in time between (i) respective times that the one or more first reflection signals are captured by the first termination device and (ii) respective times that the one or more transmitted signals are sent into the communication network from the first termination device.

20. The method of claim 18, wherein:

the communication network is a cable communication network; and the first termination device is a cable modem connected to a coaxial electrical cable of the communication network.

* * * * *